(12) United States Patent
Katsuyama

(10) Patent No.: US 8,125,655 B2
(45) Date of Patent: Feb. 28, 2012

(54) READING DEVICE, IMAGE FORMING APPARATUS, ELECTRONIC PAPER, AND COMPUTER PROGRAM PRODUCT

(75) Inventor: Goro Katsuyama, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 1161 days.

(21) Appl. No.: 11/976,384

(22) Filed: Oct. 24, 2007

(65) Prior Publication Data

US 2008/0112021 A1 May 15, 2008

(30) Foreign Application Priority Data

Nov. 10, 2006 (JP) .................................. 2006-305471

(51) Int. Cl.
*H04N 1/04* (2006.01)
(52) U.S. Cl. ......... 358/1.12; 358/1.1; 358/1.13; 358/1.9
(58) Field of Classification Search ............... 358/1.12, 358/1.1, 1.13, 1.9, 474
See application file for complete search history.

(56) References Cited

U.S. PATENT DOCUMENTS

| | | | |
|---|---|---|---|
| 6,304,739 B1 | 10/2001 | Katsuyama et al. | |
| 6,507,720 B2 | 1/2003 | Kabumoto et al. | |
| 6,690,901 B2 | 2/2004 | Katsuyama et al. | |
| 6,785,488 B2 | 8/2004 | Katsuyama | |
| 6,848,685 B2 | 2/2005 | Katsuyama | |
| 6,882,817 B2 | 4/2005 | Kita | |
| 7,108,338 B2 | 9/2006 | Katsuyama et al. | |
| 7,133,629 B2 | 11/2006 | Kita | |
| 7,257,348 B2 | 8/2007 | Matsumoto et al. | |
| 2004/0114958 A1 | 6/2004 | Katsuyama et al. | |
| 2004/0131392 A1 | 7/2004 | Matsumoto et al. | |
| 2005/0141004 A1* | 6/2005 | Kiwada ........................ 358/1.12 |
| 2005/0211594 A1 | 9/2005 | Katsuyama | |
| 2005/0226655 A1 | 10/2005 | Katsuyama et al. | |
| 2005/0270345 A1 | 12/2005 | Katsuyama et al. | |
| 2006/0034642 A1 | 2/2006 | Taguchi et al. | |
| 2006/0263116 A1 | 11/2006 | Katsuyama | |
| 2007/0028187 A1 | 2/2007 | Katsuyama | |

FOREIGN PATENT DOCUMENTS

| | | |
|---|---|---|
| JP | 2000-069244 | 3/2000 |
| JP | 2000-151925 | 5/2000 |
| JP | 2005-012701 | 1/2005 |
| JP | 2006-059138 | 3/2006 |
| JP | 2006-219164 | 8/2006 |

OTHER PUBLICATIONS

Office Action dated Mar. 1, 2011 issued in corresponding Japanese Application No. 2006-305471.

* cited by examiner

*Primary Examiner* — Houshang Safaipour
(74) *Attorney, Agent, or Firm* — Harness, Dickey & Pierce, P.L.C.

(57) ABSTRACT

A copier includes an ADF that transports electronic paper and a paper medium to a read position. The ADF includes a medium type detector, a controller, a communication reader, and an optical reader. The medium type detector discriminates between electronic paper and a paper medium. The controller controls transport of electronic paper and a paper medium. The communication reader reads electronic data stored in the electronic paper at the read position. The optical reader optically reads an image on a paper medium at the read position to obtain electronic data.

11 Claims, 24 Drawing Sheets

READING DEVICE, IMAGE FORMING APPARATUS, ELECTRONIC PAPER, AND COMPUTER PROGRAM PRODUCT

CROSS-REFERENCE TO RELATED APPLICATIONS

The present application claims priority to and incorporates by reference the entire contents of Japanese priority document, 2006-305471 filed in Japan on Nov. 11, 2006.

BACKGROUND OF THE INVENTION

1. Field of the Invention

The present invention relates to a reading device, an image forming apparatus, electronic paper, and a computer program product.

2. Description of the Related Art

Because of its productivity and space-saving ability, a reading device is popular that is applicable to a sheet-through system in which a scanner part is fixed and an image is obtained by carrying a document at a predetermined speed. For example, Japanese Patent Application Laid-open No. 2000-151925 discloses this type of reading device that sets a transport speed corresponding to the type of paper medium (such as thin paper and thick paper) in a plurality of sheets loaded on a table or read magnification, to read a plurality of documents efficiently.

On the other hand, Japanese Patent Application Laid-open No. 2006-219164 discloses an electronic medium called electronic paper (hereinafter, "e-paper") having functions of a paper medium and an electronic display. The e-paper includes, for example, an electrophoretic display. This display forms an image by filling white particles (e.g., titanium oxide) and black particles (e.g., carbon black) charged positive and negative, respectively, in a microcapsule filled with a transparent liquid, coating this on a transparent base material, and applying an external voltage thereto to attract respective particles onto a display surface. This type of e-paper can be connected to a personal computer via a universal serial bus (USB), so that the personal computer can update the electronic data to be displayed on the display or read the electronic data stored in a memory of the display. Further, it has been studied heretofore to constitute the display by a polymer film.

In the conventional reading device, however, it has not been taken into consideration to read both the paper medium and the e-paper.

SUMMARY OF THE INVENTION

It is an object of the present invention to at least partially solve the problems in the conventional technology.

According to an aspect of the present invention, a reading device includes a transporting unit that transports, as an original, any one of electronic paper and a paper medium or both to a read position, the electronic paper including an electronic-data storage unit that stores therein electronic data and a first communication unit that communicates with an external device; a determining unit that includes a second communication unit to transmit a predetermined signal to the original, and determines whether the original is the electronic paper or the paper medium based on a response to the predetermined signal; a transport control unit that controls transport by the transporting unit based on a determination by the determining unit; a first reading unit that includes a third communication unit to communicate with the first communication unit at the read position, and reads the electronic data stored in the electronic-data storage unit; a second reading unit that optically reads an image on the paper medium at the read position to obtain electronic data of the image; and a read control unit that controls reading operation by the first reading unit and the second reading unit.

According to another aspect of the present invention, a computer program product comprising a computer usable medium having computer readable program codes embodied in the medium that, when executed, causes a computer to execute transmitting a predetermined signal to an original; determining whether the original is electronic paper or a paper medium based on a response to the predetermined signal; controlling transport of the original to a read position based on a determination result obtained at the determining; and controlling reading operation to read electronic data of electronic paper or optically read an image on a paper medium at the read position based on a determination result obtained at the determining.

According to still another aspect of the present invention, electronic paper includes a storage unit that stores therein electronic data divided into sections each corresponding to a page; and a communication unit that communicates with an external device to receive a signal and to transmit full-page electronic data in response to the signal.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings.

In the following, an image forming apparatus according to the embodiments is explained as, for example, a copier. However, the image forming apparatus can be an apparatus other than a copier such as a facsimile machine, a printer, and a multifunction product that combines any or all of the functions of a copier, a facsimile machine, a scanner, etc. A reading device according to the embodiments can be applied to not only a copier but also a scanner, a facsimile machine, and a multifunction product that combines any or all of the functions of a scanner, a copier, a facsimile machine, etc.

Figure 1:
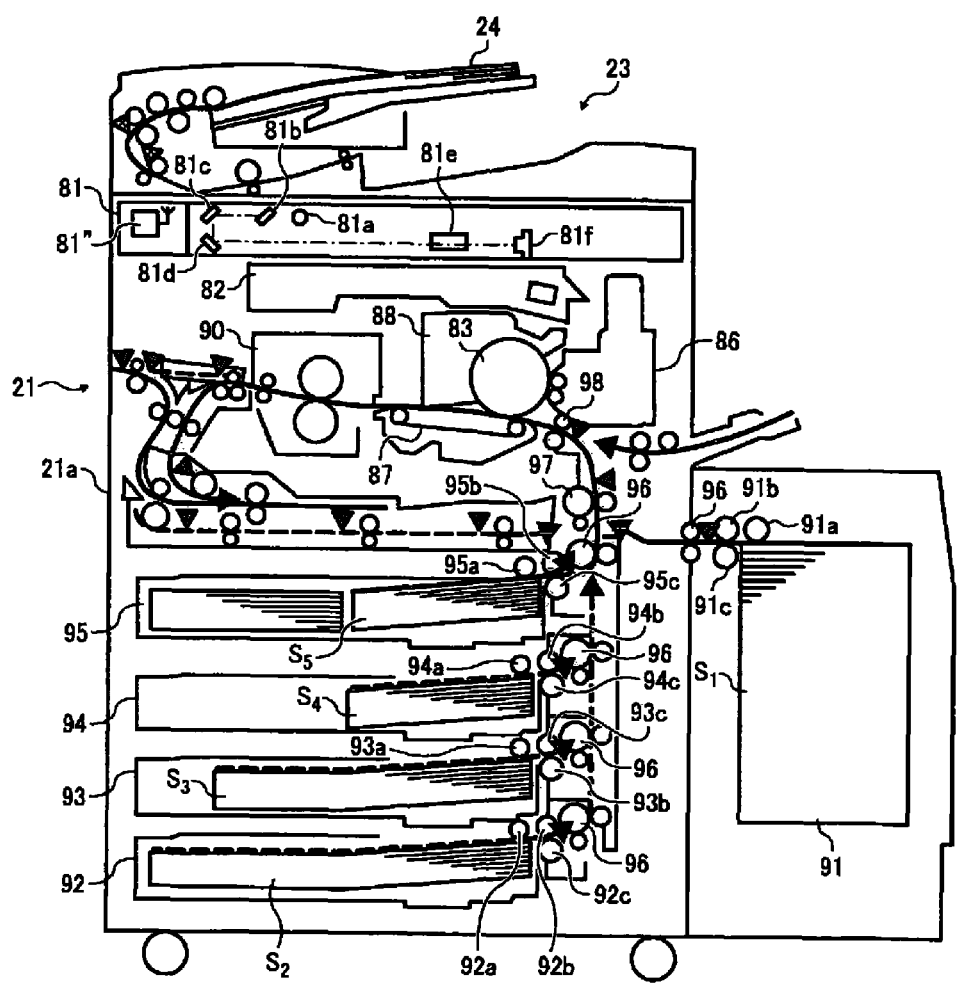
FIG. 1 is a schematic diagram of an image forming apparatus according to a first embodiment of the present invention.

FIG. 1 is a schematic diagram of a copier 21 as an image forming apparatus according to a first embodiment of the present invention. The copier 21 includes a body 21a on which is provided an automatic document feeder (ADF) 23. The ADF 23 can be freely opened and closed via a hinge mechanism (not shown) so that the exposure glass 22a is opened and closed.

Figure 2:
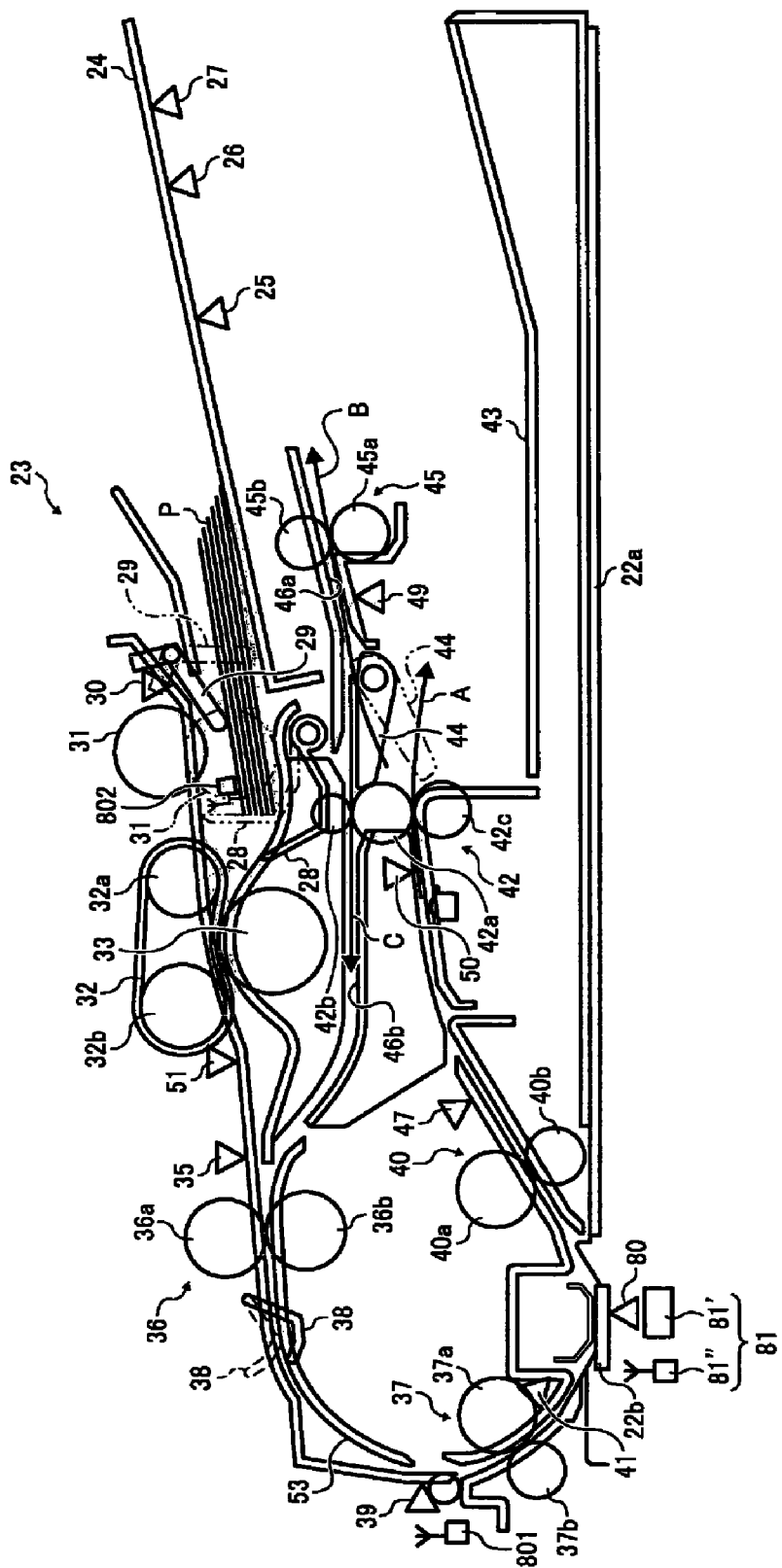
FIG. 2 is a schematic diagram of an automatic document feeder (ADF) shown in FIG. 1.

FIG. 2 is a schematic block diagram of the ADF 23. The ADF 23 includes a table 24, an exposure glass 22a formed of a translucent member, and a detector 802. A slit glass 22b formed of a smaller translucent member than the exposure glass 22a is provided adjacent to the exposure glass 22a. A sheet P is placed on the table 24 with a copy side up. The sheet P can be a paper medium, e-paper, or both.

The ADF 23 further includes length detecting sensors 25 to 27 on a table face of the table 24 to detect the length of the a sheet P. The length detecting sensors 25 to 27 have a pair of photodetector and light-emitting diode adjacent to each other. The length detecting sensors 25 to 27 are arranged in such a manner that at least whether a sheet is placed vertically or horizontally can be determined for the same size. A controller 100 determines the length of the sheet P in a transport direction based on information from the photodetector.

A stopper claw 28 is provided on a downstream side of the sheet P in the transport direction relative to the table 24, and the stopper claw 28 is movable between a butting position (indicated by a broken line) where the leading edge of the sheet P butt against the stopper claw 28 and a retracted position (indicated by a solid line) where the stopper claw 28 is retracted from the leading edge of the sheet P by an access motor 101.

Therefore, when the stopper claw 28 is at the butting position, the leading edge of the sheet P butt against the stopper claw 28, so that the edges of the sheets P are aligned. The sheets P are pressed in the width direction against a side fence (not shown) provided on the table 24. Thus, the sheets P are arranged in a direction perpendicular the transport direction.

When shifted downward, the stopper claw 28 is detected by a home-position sensor 34, and the home-position sensor 34 outputs detection information to the controller 100.

A set filler 29 and a sheet-set sensor 30 are provided on the table 24 on the leading-edge side of the sheet P. When the sheet P is placed on the table 24, the set filler 29 is pressed by the leading edge of the sheet P, and moves from a position indicated by a broken line to a position indicated by a solid line. When the sheet-set sensor 30 changes the state from a set filler-undetected state to a set filler-detected state, the sheet-set sensor 30 outputs a signal to the controller 100.

The ADF 23 further includes a reading device 81 including a communication reader 81" or an optical reader 81'. The controller 100 is connected to a main-body controller 111 in the body 21a via an interface (I/F) 107, and outputs a signal to the I/F 107. The main-body controller 111 enters standby mode for reading operation by the communication reader 81" or an optical reader 81' on the body 21a side based on the input signal.

An access roller 31 as an access unit is provided above the stopper claw 28, and a driving force is transmitted from the access motor 101 to the access roller 31 via an access cam 126 described later. The access roller 31 goes up or down between a position indicated by a solid line where the access roller is retracted from the sheet P and a position indicated by a two-dot chain line where the access roller abuts against the upper face of the sheet P.

Figure 3:
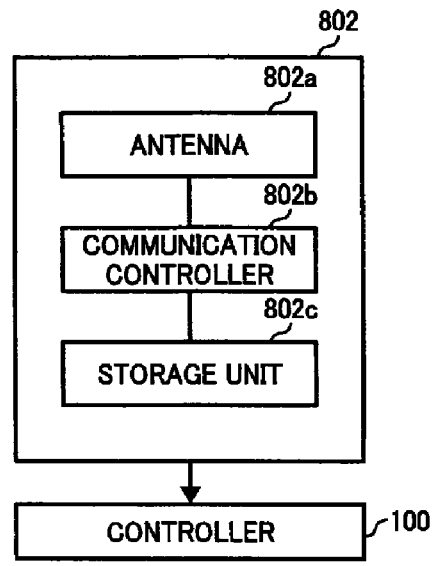
FIG. 3 is a block diagram of a detector shown in FIG. 2.

FIG. 3 is a block diagram of the detector 802. The detector 802 is located near a transport path downstream of the access roller 31 in the transport direction. The detector 802 includes an antenna 802a, a communication controller 802b, and a storage unit 802c. The antenna 802a can be, for example, a coil antenna that generates a magnetic field relative to the e-paper 900, and supplies an electromotive force due to electromagnetic coupling. A predetermined signal is transmitted to the e-paper 900 via the antenna 802a. The communication controller 802b includes a modulation/demodulation circuit and a communication control circuit to transmit a signal modulated according to a modulation scheme such as amplitude shift keying (ASK), frequency shift keying (FSK), phase shift keying (PSK) (e.g., a signal requesting medium-type information indicating a medium type) to the e-paper 900, and demodulate a signal from the e-paper 900 (e.g., a signal of medium-type information indicating that the medium type is e-paper). The storage unit 802c stores therein medium-type information obtained by demodulating the medium-type information signal transmitted from the e-paper 900. The medium-type information is transmitted to the controller 100. The controller 100 can discriminate between the e-paper 900 and the paper medium based on the medium-type information.

Figure 4:
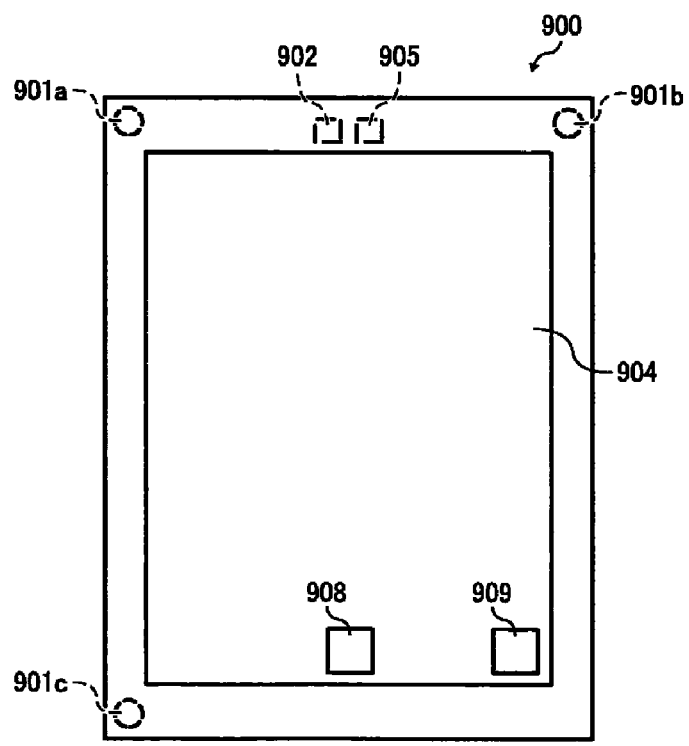
FIG. 4 is a plan view of e-paper according to the first embodiment.

FIG. 4 is a plan view of the e-paper 900. The e-paper 900 includes an e-paper display unit 904 on one side. Page information such as page number/last page number (corresponding to the total number of pages) is displayed in a first display area 908, and volume information (e.g., volume of the page/total volume) is displayed in a second display area 909 on the display surface. The e-paper display unit 904 is, for example, a liquid crystal display using a polymer film (PFLCD), and can be deformed to an arbitrary shape. Therefore, the e-paper 900 can be carried by the ADF 23 as in the paper medium. A page button (not shown) is provided for instructing page update, for example, at a peripheral edge of the display surface. According to the operation thereof, the image display is updated for each page.

Figure 5:
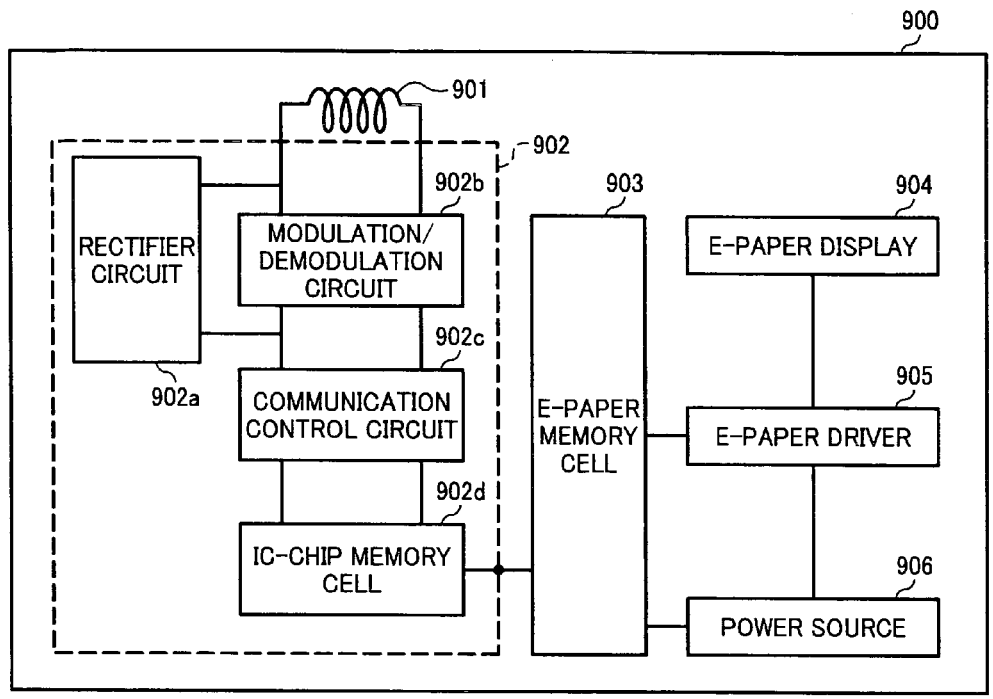
FIG. 5 is a block diagram of the e-paper.

FIG. 5 is a block diagram of the e-paper 900. The e-paper 900 includes an antenna coil 901 (corresponding to 901a, 901b, and 901c in FIG. 4), an IC chip 902 with input/output terminals, an e-paper memory cell 903, the e-paper display unit 904, an e-paper driver 905, and a power source 906.

The antenna coil 901 is connected to an IC chip 902. The e-paper memory cell 903 can be a rewritable nonvolatile memory cell such as electrically erasable programmable read only memory (EEPROM). The e-paper display unit 904 can be formed of a microcapsule electrophoretic display. The e-paper driver 905 converts information (electronic data) stored in the IC-chip memory cell 902d to a display format. As the power source 906 is used, for example, solar cell or microcell.

The IC chip 902 includes a rectifier circuit 902a that rectifies voltage generated by electromagnetic induction with the reader (e.g., the communication reader 81"), a modulation/demodulation circuit 902*b* that demodulates a signal received via the antenna coil 901 and modulates a signal to be transmitted via the antenna coil 901, a communication control circuit 902*c* connected to the IC-chip memory cell 902*d* and the like, and the IC-chip memory cell 902*d* that stores therein various pieces of information (e.g., electronic data of the image, volume information indicating the volume of the electronic data, and page information). The antenna coils 901*a*, 901*b*, and 901*c* are provided at three corners so that at least one of them is always positioned on the front-end side regardless of the direction in which a sheet is placed.

The e-paper display unit 904 displays an image for each page. The IC-chip memory cell 902*d* stores therein image information divided by page (electronic data), page information, volume information, and medium-type information indicating that the paper medium is e-paper therein. The image includes characters (text), graph, photograph, and the like. The communication control circuit 902*c* controls such that a medium-type information signal is transmitted in response to a signal from the detector 802, a volume information signal is transmitted in response to a signal from the volume detector 801, and a full-page electronic data signal is transmitted in response to a signal from the communication reader 81".

With this configuration, when the reader (e.g., the communication reader 81") approaches the e-paper 900, the antenna coil included in the reader and the antenna coil 901 are electromagnetically coupled due to the magnetic field of the antenna coil included in the reader. Due to the electromagnetic coupling, induced electromotive force is generated in the antenna coil 901, and flows to the rectifier circuit 902*a*. The power rectified by the rectifier circuit 902*a* is supplied to the IC chip 902 and used for startup, information update, and the like.

An operating unit 108 is provided on the body 21*a*. When a print key is pressed on the operating unit 108 and a feed signal is transmitted from the main-body controller 111 to the controller 100 via the I/F 107. Accordingly, the controller 100 normally rotates the access motor 101 to drive the stopper claw 28 to be retracted downward from the sheet P.

The home-position sensor 34 detects the stopper claw 28 that has moved to the retracted position. When the home-position sensor 34 detects the stopper claw 28, the controller 100 reversely rotates the access motor 101 to bring the access roller 31 in contact with the sheet P.

Then, the access roller 31 starts to feed sheets P (ideally, one sheet) on the table 24 due to the normal rotation of a feed motor 102. The sheet P is fed to a separation and transport unit including a feed belt 32 and a reverse roller 33 located downstream of the access roller 31. The detector 802 transmits a signal to the sheet P to determine whether the sheet P is e-paper based on a response therefrom. In response to the signal, the controller 100 obtains medium-type information.

The feed belt 32 extends around a drive roller 32*a* and a driven roller 32*b*. The feed belt 32 revolves when a driving force is transmitted from the feed motor 102 to the drive roller 32*a*.

The feed belt 32 revolves in a feed direction (clockwise direction), when the feed motor 102 is normally driven. The reverse roller 33 includes a built-in torque limiter (not shown). When the feed motor 102 is normally driven, the reverse roller 33 rotates in an opposite direction to the feed direction. Accordingly, the uppermost sheet are separated from sheets therebelow, and only the uppermost sheet is fed.

Specifically, the reverse roller 33 is brought into contact with the feed belt 32 at a predetermined pressure. The predetermined pressure is set such that when the reverse roller 33 directly comes in contact with the feed belt 32 or via only one sheet, the reverse roller 33 rotates counterclockwise together with the rotation of the feed belt 32. However, when two or more sheets enter into between the feed belt 32 and the reverse roller 33, the rotation force thereof becomes lower than a torque of the torque limiter. Accordingly, the reverse roller 33 rotates clockwise, i.e., the original rotation direction thereof, to push extra sheet back, thereby preventing double feed.

The separated sheet is detected by a separation sensor 51 located downstream of the feed belt 32. The sheet detected by the separation sensor 51 is further carried by the feed belt 32, and when the sheet is carried by a distance Xmm from a point the leading edge thereof is detected by the butting sensor 35 located downstream of the feed belt 32, the controller 100 suspends the normal rotation of the feed motor 102.

The distance Xmm is set larger than a distance between the butting sensor 35 and a nip of a pullout roller pair (rotation member) 36, so that the sheet stops in such a state that certain flexure is formed at the nip between a pullout drive roller 36*a* and a pullout driven roller 36*b*, which are in sliding contact with each other.

At this time, because the access motor 101 is normally rotated based on an instruction of the controller 100, the access roller 31 is retracted from the upper face of the sheet to carry it only by a carrying force of the feed belt 32. Accordingly, the leading edge of the sheet is butted against the nip between the pullout drive roller 36*a* and the pullout driven roller 36*b*, to correct curvature (skew) of the sheet generated at the time of separation and transport.

The pullout drive roller 36*a* and the pullout driven roller 36*b* carry the sheet, whose skew has been corrected by the reverse rotation of the feed motor 102 after the separation of the sheet, toward a read-start roller pair 37 provided on the downstream side via an inversion path. The read-start roller pair 37 includes a read-start drive roller 37*a* and a read-start driven roller 37*b*.

When the feed motor 102 is reversely rotated, the pullout drive roller 36*a* is driven. However, the driving force is not transmitted to the access roller 31 and the feed belt 32 due to an action of a one-way clutch.

A width sensor 38 is provided downstream of the pullout drive roller 36*a* and the pullout driven roller 36*b*. A plurality of width sensors 38 is arranged in the depth direction in FIG. 2, and moves between a position indicated by a solid line and a position indicated by a two-dot chain line.

The width sensor 38 moves to the position indicated by two-dot chain line upon detection of the sheet, to obtain information of width, which is a length in a direction perpendicular the transport direction of the sheet carried by the pullout drive roller 36*a* and pullout driven roller 36*b*, and transmits the detection information to the controller 100.

The controller 100 transmits size information of the sheet P on the table 24 to the main-body controller 111 based on length information from the length detecting sensors 25 to 27 and the width information from the width sensor 38.

The controller 100 counts the number of motor-driving pulses corresponding to the sheet-carried distance while the butting sensor 35 detects the leading and trailing edges of the sheet P, and calculate an accurate length of the sheet.

When the sheet is carried to the read-start roller pair 37 due to the rotation of the pullout drive roller 36*a*, the controller 100 increases the sheet-transport speed, so that the processing time of the sheet to be fed to a read position 80 on the slit glass 22*b* can be reduced. Particularly, for the second sheet and thereafter, an interval between sheets can be reduced due to the high-speed transport, thereby enabling to improve the productivity. Further, when the leading edge of the sheet is detected by the read-start sensor 39, deceleration is started before the leading edge of the sheet enters the nip of the read-start roller pair 37.

When the controller 100 determines the sheet is the e-paper 900 based on detection of the leading edge of the sheet by the read-start sensor 39 and the detection information from the detector 802, the volume detector 801 detects the total volume of the electronic data stored in the IC-chip memory cell 902*d* of the e-paper 900

Figure 6:
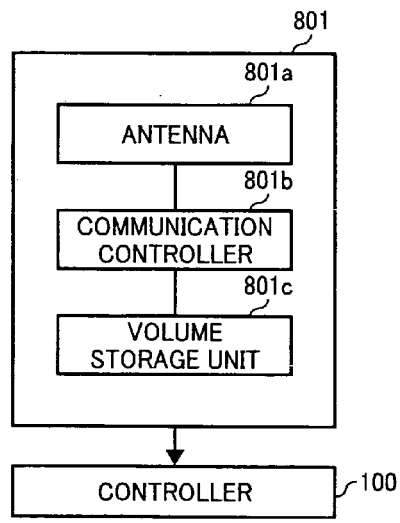
FIG. 6 is a block diagram of a volume detector shown in FIG. 2.

FIG. 6 is a block diagram of the volume detector 801. The volume detector 801 includes an antenna 801*a*, a communication controller 801*b*, and a volume storage unit 801*c*. The antenna 801*a* includes, for example, a coil antenna, generates a magnetic field relative to the e-paper 900, and supplies an electromotive force due to electromagnetic coupling. A predetermined signal is transmitted to the e-paper 900 via the antenna 801*a*. The communication controller 801*b* includes a modulation/demodulation circuit and a communication control circuit to transmit a signal modulated according to a modulation scheme such as ASK, FSK, and PSK (e.g., a signal requesting volume information indicating the volume of the full-page electronic data of the e-paper) to the e-paper 900, and demodulate a signal from the e-paper 900 (e.g., a signal of the volume information). The volume storage unit 801*c* stores therein the volume information obtained by demodulating the volume information signal transmitted from the e-paper 900. The volume information is transmitted to the controller 100. The controller 100 calculates communication time required for the communication reader 81" to read the full pages of the electronic data from the e-paper 900 based on the volume information, to set the transport speed. Alternatively, the main-body controller 111 obtains the volume information via the controller 100, calculates the required communication time to transmit the calculated time to the controller 100. The controller 100 sets the transport speed based on the required communication time. The communication controller 801*b* and the volume storage unit 801*c* can be formed of an IC chip.

Figure 7:
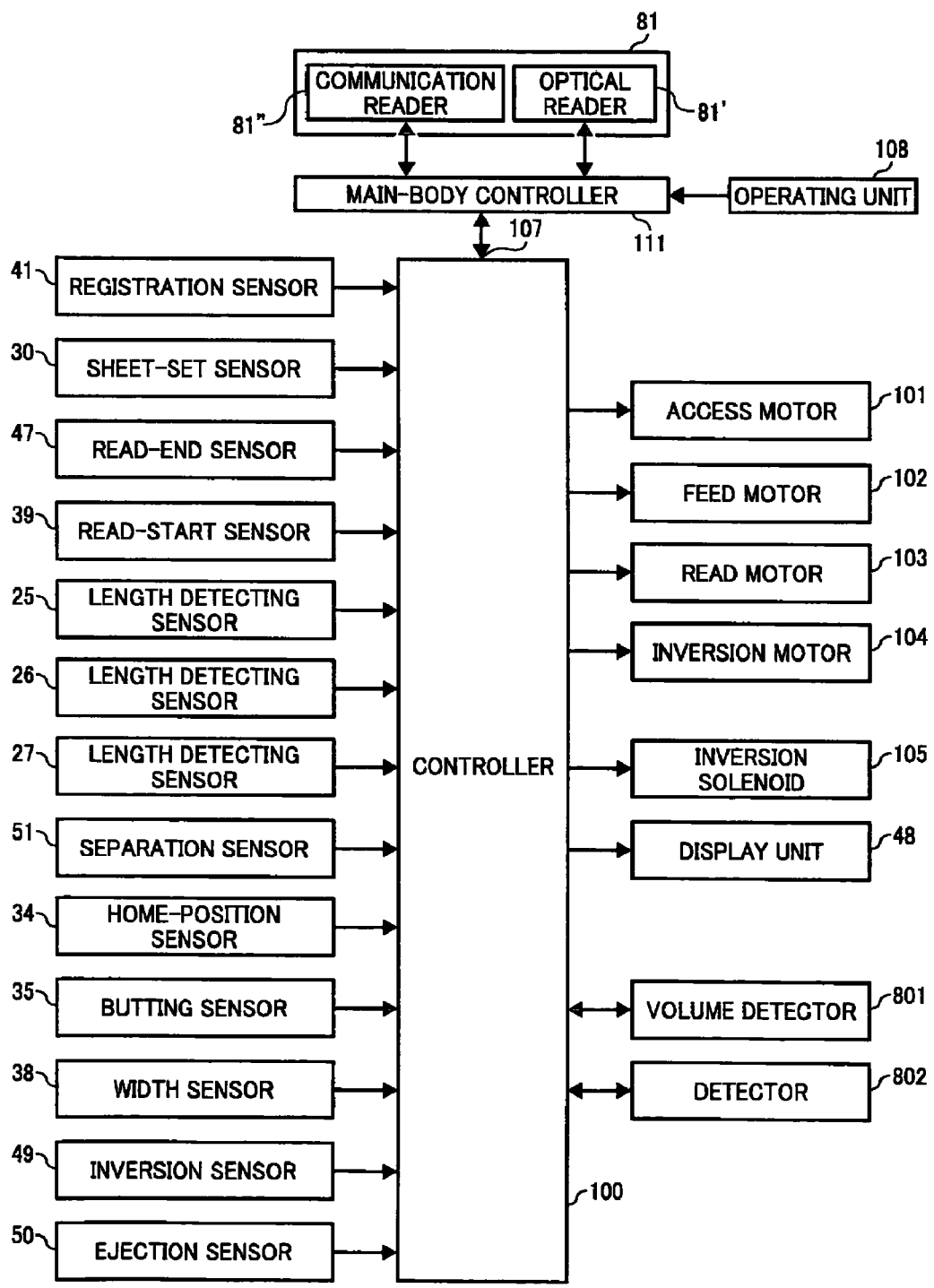
FIG. 7 is a block diagram of a control system of the ADF shown in FIG. 2.

FIG. 7 is a block diagram of a control system of the ADF 23. The controller 100 drives and stops the feed motor 102 so that the transport distance becomes longer by the distance Xmm than the distance from the read-start sensor 39 to the read-start roller pair 37, thereby stopping the sheet with the leading edge thereof being butted against the nip of the stopped read-start roller pair 37 to form certain flexure. As a result, the skew generated at the time of transport of the sheet by the pullout roller pair 36 can be corrected. In the first embodiment, the read-start roller pair 37 constitutes a roller pair for skew correction.

The controller 100 transmits a registration-suspending signal to the main-body controller 111 via the I/F 107, when the sheet stops temporarily (registration suspension) at the nip of the read-start roller pair 37.

When the registration-suspending signal is transmitted, the controller 100 receives a read-start signal from the main-body controller 111. The controller 100 then drives a read motor 103 so that the registration-suspended sheet is carried at a transport speed corresponding to read magnification (in the case of paper medium) or the required communication time (in the case of e-paper), thereby transporting the sheet by a read-end roller pair 40. The read-end roller pair 40 includes a read-end drive roller 40*a* and a read-end driven roller 40*b*.

When the read-start signal is received before the leading edge of the sheet reaches the registration sensor 41 provided upstream of the slit glass 22*b*, a registration-unsuspended read operation is performed. In the case of the registration-unsuspended read operation, registration suspension is not performed, and read is executed while maintaining the read transport speed.

The registration sensor 41 detects the leading edge of the sheet. When the leading edge of the sheet is detected by the registration sensor 41, the controller 100 starts pulse count of the read motor 103, and transmits a gate signal indicating an effective image area in a vertical scanning direction to the main-body controller 111 at the timing when the leading edge of the sheet reaches the read position 80 on the slit glass 22*b*. The gate signal is continuously transmitted until the trailing edge of the sheet passes through the read position 80. Further, the controller 100 transmits a signal indicating read and transport start of the e-paper to the main-body controller 111 at the timing when the leading edge of the e-paper reaches the read position 80.

The sheet having passed through the read position 80 via the inversion path 53 is reversed and carried to the read-end roller pair 40 and an ejection roller 42, and ejected to an ejection tray 43 after two-sided or one-sided reading.

The ejection roller 42 includes an ejection drive roller 42*a*, an upper ejection driven roller 42*b*, and a lower ejection driven roller 42*c*, and is equipped with a switching claw 44 as a switching unit downstream of the ejection roller 42.

When a sheet for two-sided reading is carried, the switching claw 44 is driven by an inversion solenoid 105. Accordingly, the switching claw 44 moves to a position indicated by two-dot chain line before the leading edge of the sheet having passed through the read position 80 reaches the ejection roller 42 at the time of reading.

At this time, the sheet is carried to a switchback path 46*a* by the ejection drive roller 42*a*, the lower ejection driven roller 42*c*, and an inversion roller pair 45 as a switch-back roller pair driven by an inversion motor 104.

When the drive pulse of the read motor 103 reaches the predetermined pulse after the trailing edge of the sheet has been detected by the read-end sensor 47 provided downstream of the read-end roller pair 40, the controller 100 determines that the trailing edge of the sheet has come out of the lower ejection driven roller 42*c*, and turns off the inversion solenoid 105 to move the switching claw 44 to a position indicated by solid line.

After the drive pulse of the read motor 103 has reached the predetermined pulse, the controller 100 reversely rotates the inversion roller pair 45 by reversely rotating the inversion motor 104, thereby switching back the sheet toward the pullout roller pair 36.

At this time, the driving direction of the read motor 103 is the same direction, and the driving direction of the inversion motor 104 is an opposite direction. The inversion motor 104 and the read motor 103 are driven at high speed to reduce the processing time.

When the sheet starts to switch back, after the drive pulse of the inversion motor 104 has reached the predetermined pulse, the controller 100 reversely rotates the feed motor 102 at high speed, to carry the sheet toward the pullout roller pair 36 at high speed.

When the trailing edge of the sheet carried in a re-feed path 46*b* is detected by an inversion sensor 49, the controller 100 stops reverse rotation of the inversion roller pair 45 based on the detection information from the inversion sensor 49.

The skew of the sheet is corrected by the pullout roller pair 36, and one side of the sheet is read. After the sheet is switched back in the switchback path 46*a*, the sheet is carried to the read position 80 through the re-feed path 46*b*. An inversion operation is performed for arranging the sheet face, and the sheet is ejected onto the lower ejection driven-roller tray 43 without reading operation.

An ejection sensor 50 is provided upstream of the lower ejection driven roller 42, and the ejection sensor 50 detects the trailing edge of the sheet to output a signal to the controller 100. The controller 100 determines that the sheet is ejected based on the detection signal.

A display unit 48 is provided on the body 21*a*, and the controller 100 determines presence of jam based on the detection information from the butting sensor 35, the read-start sensor 39, the registration sensor 41, the read-end sensor 47, the inversion sensor, and the ejection sensor 50 and the detection information from the length detecting sensors 25 to 27. When a jam occurs, the display unit 48 displays the occurrence of jam.

On the other hand, the copier 21*a* includes the reading device 81 in the body 21*a*. Image information read by the reading device 81 is irradiated onto a photoconductor drum 83 by a write unit 82.

The reading device 81 includes the optical reader 81' and the communication reader 81". The optical reader 81*i* includes a light source 81*a* that illuminates the sheet on the exposure glass 22*a* or the slit glass 22*b*, a first mirror 81*b*, a second mirror 81*c*, and a third mirror 81*d* that respectively reflect light reflected from the sheet, a lens 81*e* that images the light reflected from the third mirror 81*d* on a charge-coupled device (CCD) image sensor 81*f*, and the CCD image sensor 81*f* that converts the light imaged by the lens 81*e* to an electric signal.

The light source 81*a* and the first mirror 81*b* are fitted to a first carrier (not shown), and the second mirror 81*c* and the third mirror 81*d* are fitted to a second carrier. The first and the second carriers can move along the exposure glass 22*a* and the slit glass 22*b* in FIG. 1.

Upon reading of a sheet placed on the exposure glass 22*a*, the first and the second carriers are shifted laterally in FIG. 1 below the exposure glass 22*a*. Upon reading of a sheet passing through the slit glass 22*b*, the first and the second carriers are stopped below the slit glass 22*b*. The optical reader 81' can read the paper medium and an image (character (text), graph, photograph, etc.) displayed on the e-paper 900. The electronic data of the image can be transmitted to the main-body controller 111 and stored in a memory (not shown), or transmitted to a network via a communication unit (not shown).

Because the optical reader 81' and the communication reader 81" are integrally formed, the communication reader 81" is moved and stopped together with the optical reader 81' by the first and the second carriers. The communication reader 81" then communicates with the e-paper placed on the exposure glass 22*a*, with the display face placed downward, or the e-paper passing through the slit glass 22*b*, to read the electronic data. It is desirable that the communication reader 81" is provided close to the read position 80 to reduce power consumption by reducing the communication distance with the e-paper. By integrally forming the optical reader 81' and the communication reader 81" to achieve unitization, energy saving and space saving can be realized.

Figure 8:
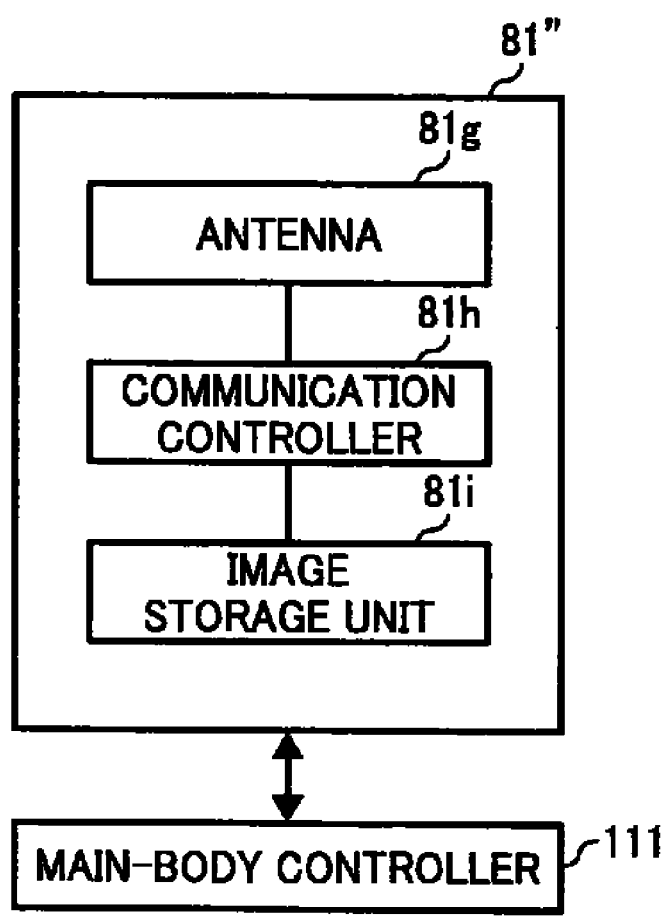
FIG. 8 is a block diagram of a communication reader shown in FIG. 2.

FIG. 8 is a block diagram of the communication reader 81". The communication reader 81" includes an antenna 81*g*, a communication controller 81*h*, and an image storage unit 81*i*. The antenna 81*g* includes, for example, a coil antenna, generates a magnetic field relative to the e-paper 900, and supplies an electromotive force due to electromagnetic coupling. A predetermined signal is transmitted to the e-paper 900 via the antenna 81*g*. The communication controller 81*h* includes a modulation/demodulation circuit, a communication control circuit, and an amplifier circuit to transmit a signal modulated according to a modulation scheme such as ASK, FSK, and PSK (e.g., a signal requesting the full-page electronic data) to the e-paper 900, and demodulate a signal from the e-paper 900 (e.g., a signal of the full-page electronic data). The image storage unit 81*i* stores therein the electronic data obtained by demodulating the electronic data signal transmitted from the e-paper 900. The electronic data can also be transmitted to the main-body controller 111 and stored in a memory (not shown), and transmitted to the network via a communication unit (not shown).

The write unit 82 irradiates laser beams optically modulated according to the electronic data as the image information read by the optical reader 81' in the reading device 81 or the electronic data read by the communication reader 81", to expose the charged surface of the photoconductor drum 83 with the laser beams.

A developing apparatus 86, a transfer belt 87, a cleaning apparatus 88, and a charger and a discharger (not shown) constituting the image forming unit together with the photoconductor drum 83 are arranged around the photoconductor drum 83. The charger controls corona discharge of positive charges with grids in the dark, so that the surface of the photoconductor drum is charged to constant potential.

The write unit 82 irradiates a laser diode including the image information on the photoconductor drum 83 charged to the constant potential, and removes negative charges on the photoconductor drum 83 to form an electrostatic latent image.

The developing apparatus forms a visible image by allowing negatively-charged toner to adhere on the photoconductor drum 83 where the negative charges have been removed. A positive bias is applied to the transfer belt 87, and the transfer belt 87 transfers the negatively-charged visible image onto a transfer sheet as a recording medium and carries the transfer sheet.

The cleaning apparatus 88 includes a cleaning blade, to scrape off the toner remaining on the photoconductor drum 83. The discharger lights up light emitting diodes (LEDs) to remove the residual charges on the photoconductor drum 83, to prepare for the next image formation on the next transfer sheet.

The transfer sheet including the image formed thereon is carried to a fuser 90, so that the toner image is fixed on the transfer sheet by the fuser 90.

Encasing cassettes 91 to 95, in which transfer sheets S1 to S5 of different sizes are stored, are provided in the body 21*a*. The transfer sheets in the encasing cassettes 91 to 95 is fed by access rollers 91*a* to 95*a*, and separated by feed rollers 91*c* to 95*c* rotating in the transport direction and reverse rollers 91*c* to 95*c* in sliding contact with the feed rollers 91*c* to 95*c*. The transfer sheet is carried to a registration roller pair 98 via relay roller pairs 96 and 97. The transfer sheet is then carried to a transport path between the photoconductor drum 83 and the transfer belt 87, with the timing adjusted by the registration roller pair 98.

Figure 9:
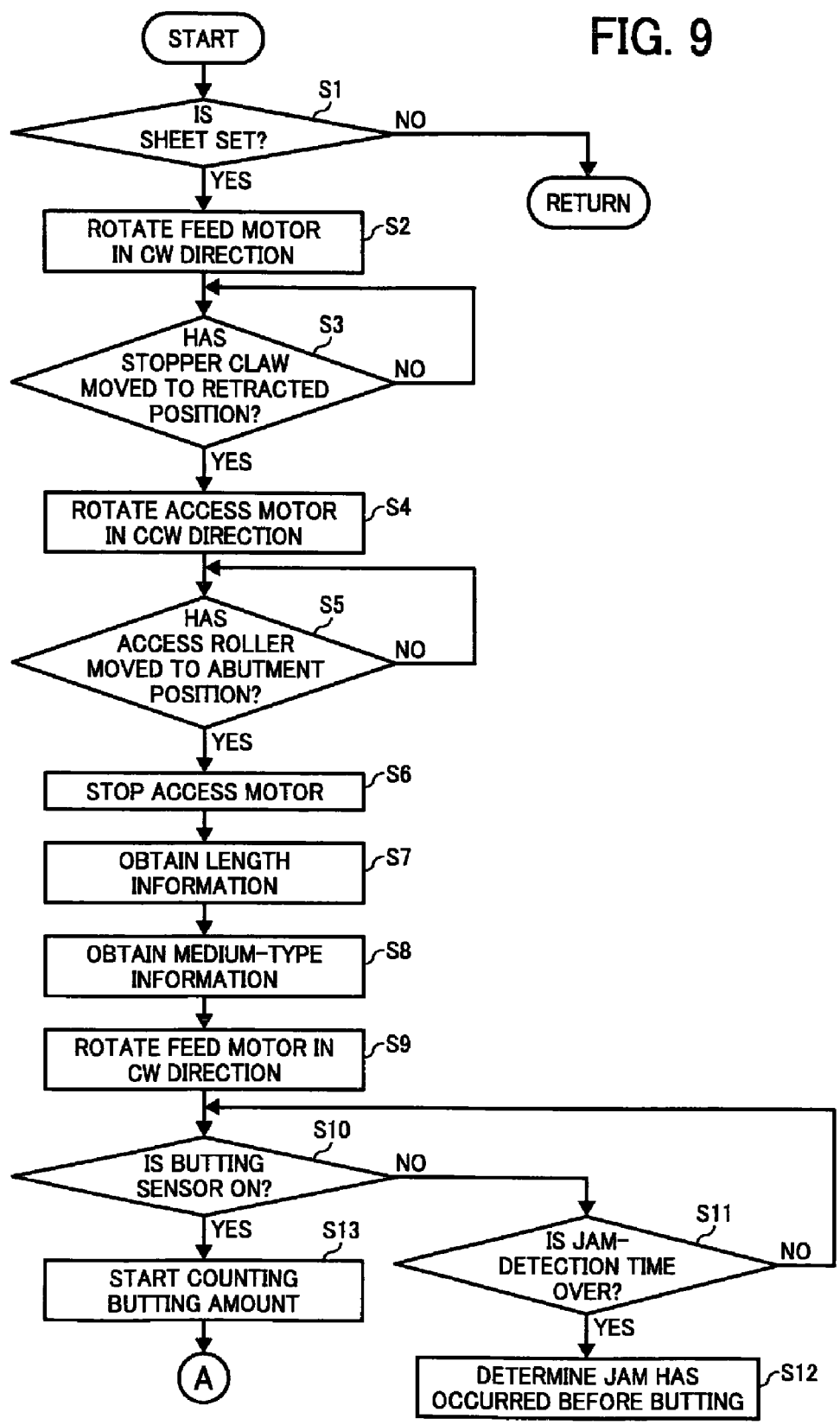
FIGS. 9 to 11 are flowcharts of transport-control process according to the first embodiment.
Figure 10:
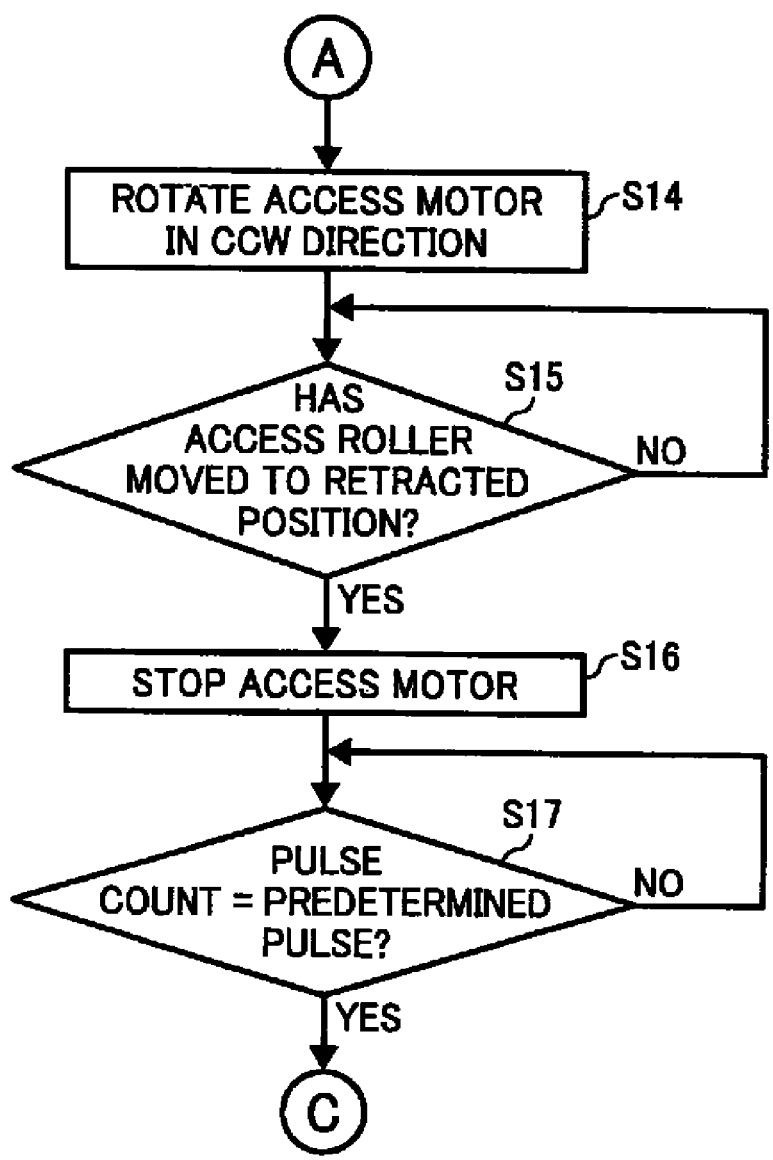
Figure 11:
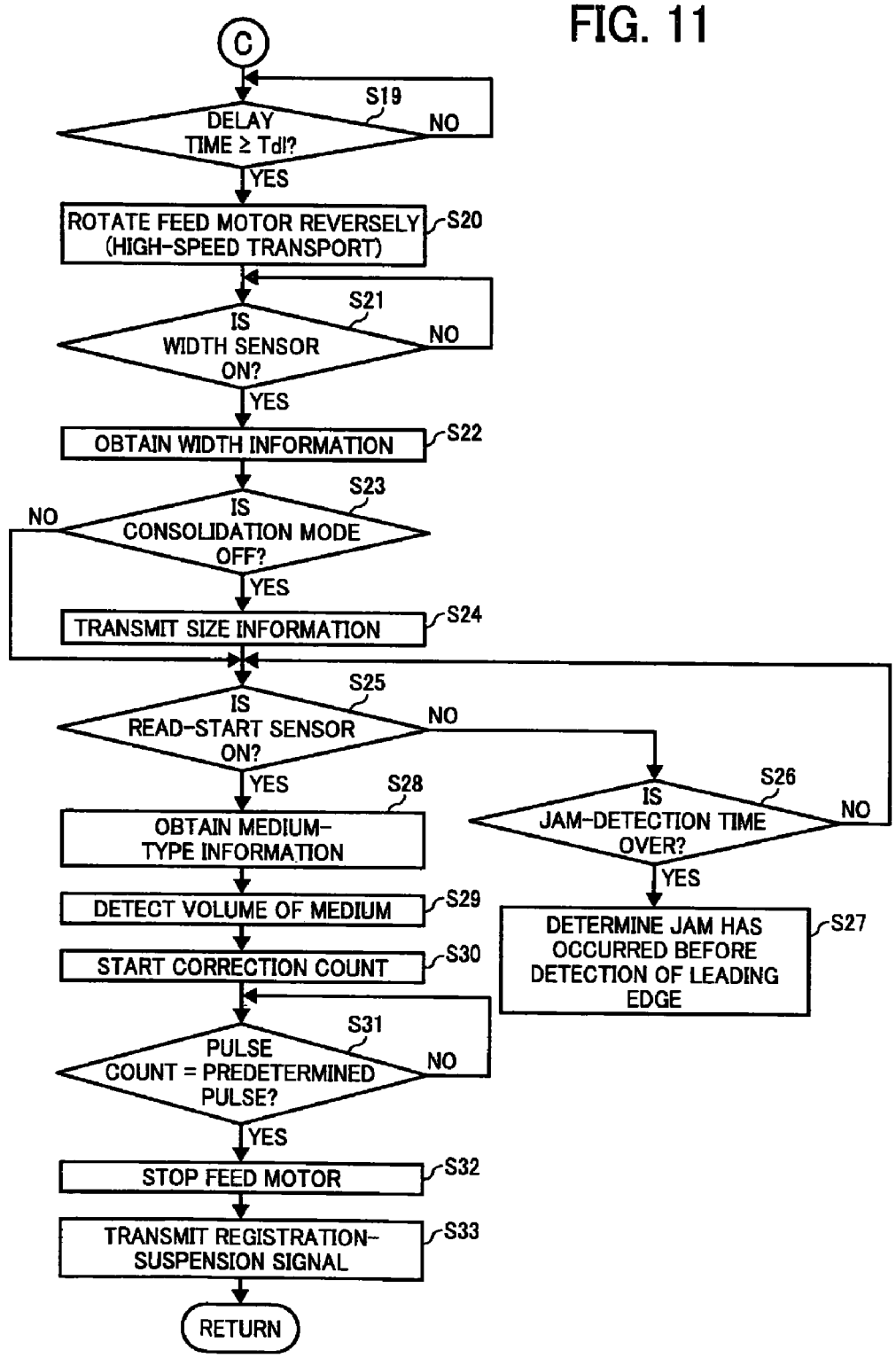

FIGS. 9 to 11 are flowcharts of transport-control process for transporting a sheet controlled by the controller 100. In the following, the process in one-sided mode is explained as an example, in which one side of a sheet (paper medium, e-paper, etc.) is read and transported.

As shown in FIG. 9, the controller 100 determines whether a sheet is set on the table 24 based on the detection information from the length detecting sensors 25 to 27 (step S1).

When the print key on the operating unit 108 is pressed, a feed signal is transmitted from the main-body controller 111 to the controller 100 via the I/F 107, and the controller 100 rotates the feed motor 102 in the clockwise direction (hereinafter, "CW direction") (step S2). At this time, the stopper claw 28 is retracted from the leading edge of the sheet.

The controller 100 determines whether the stopper claw 28 has moved to the retracted position based on the detection information from the home-position sensor 34 (step S3). When the stopper claw 28 has moved to the retracted position (YES at step S3), the controller 100 reversely rotates the access motor 101 in the counterclockwise direction (hereinafter, "CCW direction") (step S4).

The controller 100 then determines whether the access roller 31 has moved to an abutment position (step S5). When the access roller 31 has moved to the abutment position (YES at step S5), the controller 100 stops the access roller 31 (step S6). The controller 100 obtains the length of the sheet based on the detection information from the length detecting sensors 25 to 27 (step S7). After obtaining medium-type information based on the detection information from the detector 802 near the access roller 31 (step S8), the controller 100 rotates the feed motor 102 in the CW direction (step S9). Accordingly, after the one being uppermost on a stack of sheets is separated from the stack by the access roller 31, the uppermost sheet is separated by the feed belt 32 and the reverse roller 33.

The controller 100 then determines whether the butting sensor 35 is ON (step S10). When the butting sensor 35 is not ON (NO at step S10), the controller 100 determines whether the jam-detection time is over (step S11). When the jam-detection time is over (YES at step S11), the controller 100 determines that a jam has occurred before the position of the butting sensor 35, and displays jam notification on the display unit 48 (step S12).

On the other hand, when the butting sensor 35 is ON at step S10, the controller 100 counts the butting amount (step S13). That is, the controller 100 starts counting of the drive pulse of the feed motor 102 corresponding to the distance Xmm set larger than the distance between the butting sensor 35 and the pullout roller pair 36.

As shown in FIG. 10, the controller 100 reversely rotates the access motor 101 in the CCW direction (step S14), and determines whether the access roller 31 has moved to the retracted position (step S15). When the access roller 31 has moved to the retracted position (YES at step S15), the controller 100 stops the access motor 101 (step S16).

The controller 100 determines whether the pulse count of the feed motor 102 has reached a predetermined pulse corresponding to a butting amount Ymm (step S17). When the pulse cont has reached the predetermined pulse, the process control proceeds to step S19 in FIG. 11. The controller 100 determines whether the delay time is a predetermined delay time Tdl (step S19). When the controller 100 determines that the delay time is equal to or greater than the predetermined delay time Tdl (YES at step S19), the process control proceeds to step S20. At the point the feed motor 102 reaches the predetermined pulse, the sheet is pressed against the pullout roller pair 36 with predetermined flexure, and the skew of the sheet is corrected.

In the first embodiment, the next sheet is carried from the pullout roller pair 36 by providing the predetermined delay time Tdl such that time (Tyo) required for the trailing edge of the preceding sheet to pass through the read position 80 and pass though the lower ejection driven roller 42 satisfies Tyo< (Tpo+Tdl), where Tpo is time required for the leading edge of the next sheet to reach the registration suspending position (read standby position) where the sheet stops temporarily at the nip of the read-start roller pair 37 from the position of the pullout roller pair 36 in the pre-feed of the next sheet.

The controller 100 drives the feed motor 102 to rotate reversely at high speed (step S20). With the reverse rotation of the feed motor 102, the pullout roller pair 36 is driven. However, the driving force is not transmitted to the access roller 31 and the feed belt 32 due to the operation of the one-way clutch of a pulley 140. Accordingly, the sheet is carried by the pullout roller pair 36.

The controller 100 then determines whether the width sensor 38 is ON (step S21). When the width sensor 38 is ON (YES at step S21), the controller 100 obtains the width information of the sheet based on the detection information from the width sensor 38 (step S22). As a result, the controller 100 can determine the size of the sheet on the table 24 based on the length information from the length detecting sensors 25 to 27 and the width information from the width sensor 38.

At this time, the sheet is sandwiched between the pullout roller pair 36 and the read-start roller pair 37 and carried toward the read position 80. Because the sheet-transport speed is set high, processing time for feeding the sheet to the read position 80 can be reduced. Specifically, for the second and subsequent sheets, an interval between feeding of sheets is reduced due to the high-speed transport, and therefore, productivity can be improved.

The controller 100 determines whether a consolidation mode is OFF (step S23). When the consolidation mode is OFF (YES at step S23), the controller 100 transmits size information of the sheet on the table 24 to the main-body controller 111 (step S24).

The controller 100 determines whether the read-start sensor 39 detects the leading edge of the sheet, i.e., the read-start sensor 39 is ON (step S25). When the read-start sensor 39 is not ON (NO at step S25), the controller 100 determines whether the jam-detection time is over (step S26). When the jam-detection time is over (YES at step S26), the controller 100 determines that a jam has occurred before the leading edge of the sheet is detected, and displays jam notification on the display unit 48 (step S27).

On the other hand, when determining that the read-start sensor 39 is ON at step S25, the controller 100 determines whether the sheet is e-paper based on medium-type information from the detector 802 (step S28). When the sheet is e-paper, the controller 100 instructs the volume detector 801 to detect the volume of the e-paper (step S29). The volume detector 801 transmits a signal requesting volume information indicating the volume of the full-page electronic data stored in the e-paper to the e-paper. In response to the signal, the volume detector 801 receives a volume information signal from the e-paper, thereby obtaining volume information. Subsequent to step S29, count for butting-amount correction starts (step S30). That is, the controller 100 starts counting of the drive pulse of the feed motor 102 corresponding to the butting amount Ymm set larger than the distance between the read-start sensor 39 and the read-start roller pair 37.

The controller 100 determines whether the pulse count of the feed motor 102 has reached a predetermined pulse corresponding to the butting amount Ymm (step S31). When the pulse count has reached the predetermined pulse (YES at step S31), the controller 100 stops the feed motor 102 (step S32), transmits a registration-suspension signal to the main-body controller 111 (step S33), and finishes transport to the read position 80. At the point the feed motor 102 has reached the predetermined pulse, the sheet is pressed against the read-start roller pair 37 with a predetermined flexure, thereby correcting the skew of the sheet.

Figure 12:
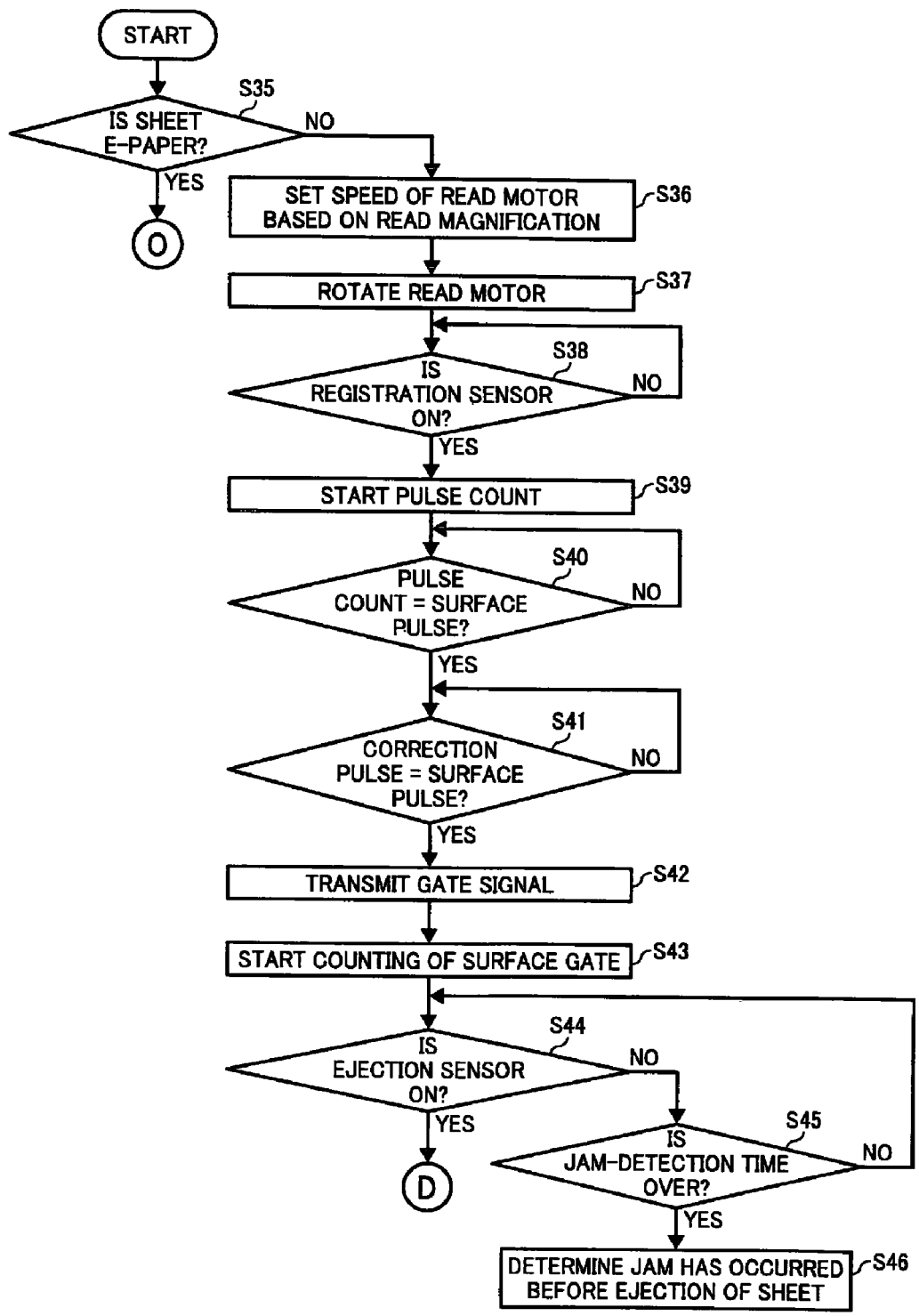
FIGS. 12 to 15 are flowcharts of transport-control process performed after reading starts according to the first embodiment.

FIGS. 12 to 15 are flowcharts of transport-control process performed after reading starts. As shown in FIG. 12, the controller 100 determines whether the sheet is e-paper (step S35). When the sheet is not e-paper but the paper medium (No at step S35), the controller 100 sets the speed of the read motor 103 based on the read magnification (step S36), and starts the reading operation upon receipt of a read-start signal from the main-body controller 111. Because the e-paper display unit displays an image only on one side (display surface), the one-sided mode includes a case that one or both of a paper medium and e-paper (corresponding to consolidation) are read and transported.

The controller 100 rotates the read motor 103 to drive the read-start roller pair 37 and the read-end roller pair 40 at a transport speed corresponding to the read magnification (step S37). The controller 100 determines whether the leading edge of the sheet has been detected by the registration sensor 41, i.e., the registration sensor 41 is ON (step S38). When the leading edge of the sheet has been detected (YES at step S38), the controller 100 starts pulse count of the read motor 103 (step S39).

The controller 100 determines whether the pulse count of the read motor 103 has reached a surface pulse corresponding to the distance between the registration sensor 41 and the read position 80 on the slit glass 22*b* (step S40).

When the pulse count has reached the surface pulse, the controller 100 then determines whether the correction pulse taking the slip rate and the like of the sheet into consideration has reached the surface pulse (step S41).

When the correction pulse has reached the surface pulse, the controller 100 transmits a gate signal indicating the effective image area in the vertical scanning direction to the main-body controller 111 at the timing when the leading edge of the sheet reaches the read position 80 (step S42), and then starts counting of the surface gate (step S43).

The controller 100 determines whether the leading edge of the sheet has been detected by the ejection sensor 50, i.e., the ejection sensor 50 is ON (step S44). When leading edge of the sheet has not been detected by the ejection sensor 50 (NO at step S44), the controller 100 determines whether the jam-detection time is over (step S45). When the jam-detection time is over (YES at step S45), the controller 100 determines that a jam has occurred before the position of the ejection sensor 50, and displays jam notification on the display unit 48 (step S46).

Figure 13:
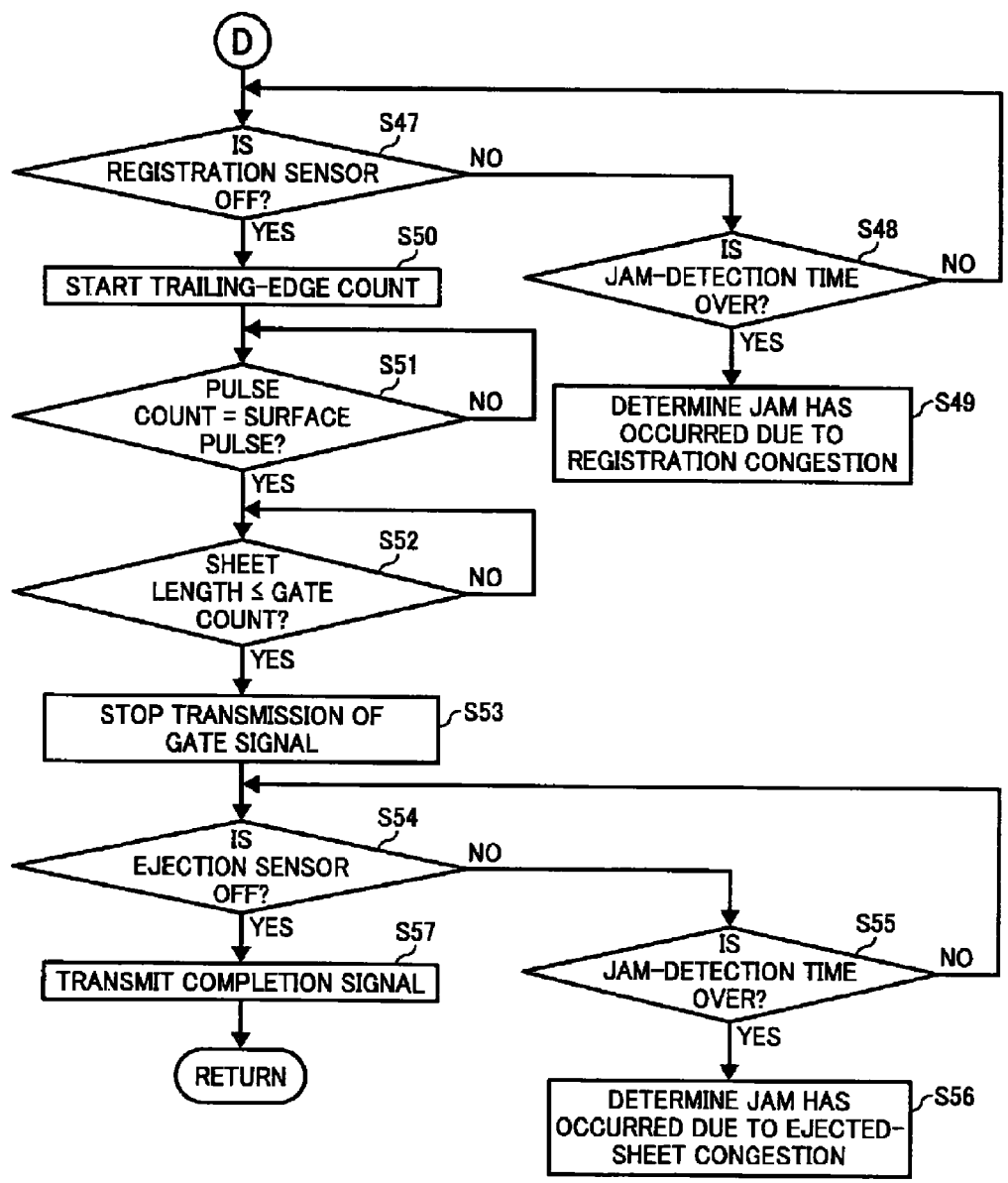

On the other hand, when determining that the ejection sensor 50 is ON at step S44, as shown in FIG. 13, the controller 100 determines whether the registration sensor 41 is OFF (step S47). When the registration sensor 41 is not OFF (No at step S47), the controller 100 determines whether the jam-detection time is over (step S48). When the jam-detection time is over (YES at step S48), the controller 100 determines that it is due to a registration-congestion jam, and displays jam notification on the display unit 48 (step S49).

When the registration sensor 41 is OFF (YES at step S47), the controller 100 starts trailing-edge count for counting the pulse of the read motor 103 (step S50).

The controller 100 determines whether the pulse count of the read motor 103 has reached the surface pulse (step S51). When the pulse count has reached the surface pulse (YES at step S51), the controller 100 determines whether the gate count is larger than the sheet length (step S52). When the gate count is larger than the sheet length, the controller 100 stops transmission of the gate signal indicating the effective image area in the vertical scanning direction (step S53).

The controller 100 determines whether the ejection sensor 50 is OFF (step S54). When the ejection sensor 50 is not OFF (NO at step S54), the controller 100 determines whether the jam-detection time is over (step S55). When the jam-detection time is over (YES at step S55), the controller 100 determines that it is due to a jam caused by ejected-sheet congestion, and displays jam notification on the display unit 48 (step S56). When the ejection sensor 50 is OFF (YES at step S54), the controller 100 transmits a signal indicating that sheet-ejection is complete to the main-body controller 111 (step S57), and the process ends.

Figure 14:
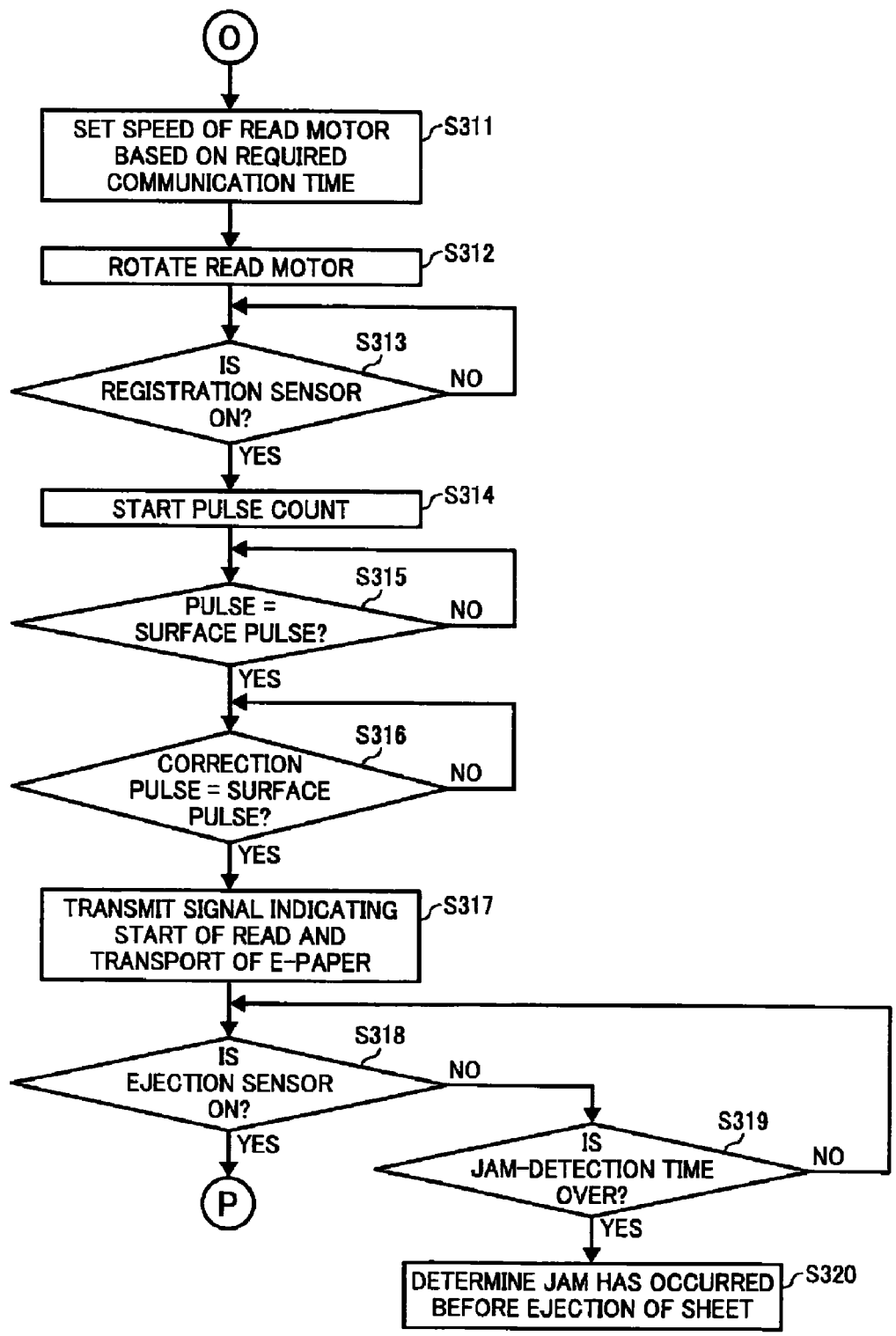

On the other hand, when the sheet is determined to be e-paper at step S35, as shown in FIG. 14, the controller 100 sets the speed of the read motor 103 based on the required communication time for the communication reader 81" (step S311). Upon receipt of a read-start signal from the main-body controller 111, the controller 100 rotates the read motor 103 to drive the read-start roller pair 37 and the read-end roller pair 40 at a transport speed corresponding to the required communication time (step S312). The controller 100 calculates required communication time based on the volume of the e-paper detected at step S28. The controller 100 also sets a transport pressure between rollers involved with read and transport (step S311).

The controller 100 determines whether the leading edge of the sheet has been detected by the registration sensor 41, i.e., the registration sensor 41 is ON (step S313). When the registration sensor 41 is ON (YES at step S313), the controller 100 starts pulse count of the read motor 103 (step S314).

The controller 100 determines whether the pulse count of the read motor 103 has reached the surface pulse corresponding to the distance between the registration sensor 41 and the read position 80 on the slit glass 22*b* (step S315). When the pulse count has reached the surface pulse, the controller 100 determines whether the correction pulse taking the slip rate and the like of the sheet into consideration has reached the surface pulse (step S316).

When the correction pulse has reached the surface pulse, the controller 100 transmits a signal indicating start of read and transport of the e-paper to the main-body controller 111 at the timing when the leading edge of the sheet reaches the read position 80 (step S317).

The communication reader 81" transmits a signal requesting the full-page electronic data to the e-paper. In response to the signal, the e-paper transmits the full-page electronic data to the communication reader 81" in batch. The communication reader 81" then compares the volume information (obtained by the controller 100 from the volume detector 801 at step S28 in FIG. 11) transmitted beforehand from the controller 100 via the main-body controller 111 with the volume of the electronic data transmitted from the e-paper. When the volume indicated by the volume information matches the volume of the electronic data, the communication reader 81" transmits a signal indicating read completion of the full-page electronic data.

Alternatively, the communication reader 81" can transmit the volume information of the received electronic data of the e-paper to the main-body controller 111. In this case, the main-body controller 111 compares the volume information with the volume information of the electronic data. When the volume indicated by the volume information matches the volume of the electronic data, the main-body controller 111 transmits the signal indicating read completion to the controller 100.

The controller 100 determines whether the leading edge of the sheet has been detected by the ejection sensor 50, i.e., the ejection sensor 50 is ON (step S318). When the leading edge of the sheet has not been detected by the ejection sensor 50 (NO at step S318), the controller 100 determines whether the jam-detection time is over (step S319). When the jam-detection time is over (YES at step S319), the controller 100 determines that a jam has occurred before the position of the ejection sensor 50, and displays jam notification on the display unit 48 (step S320).

Figure 15:
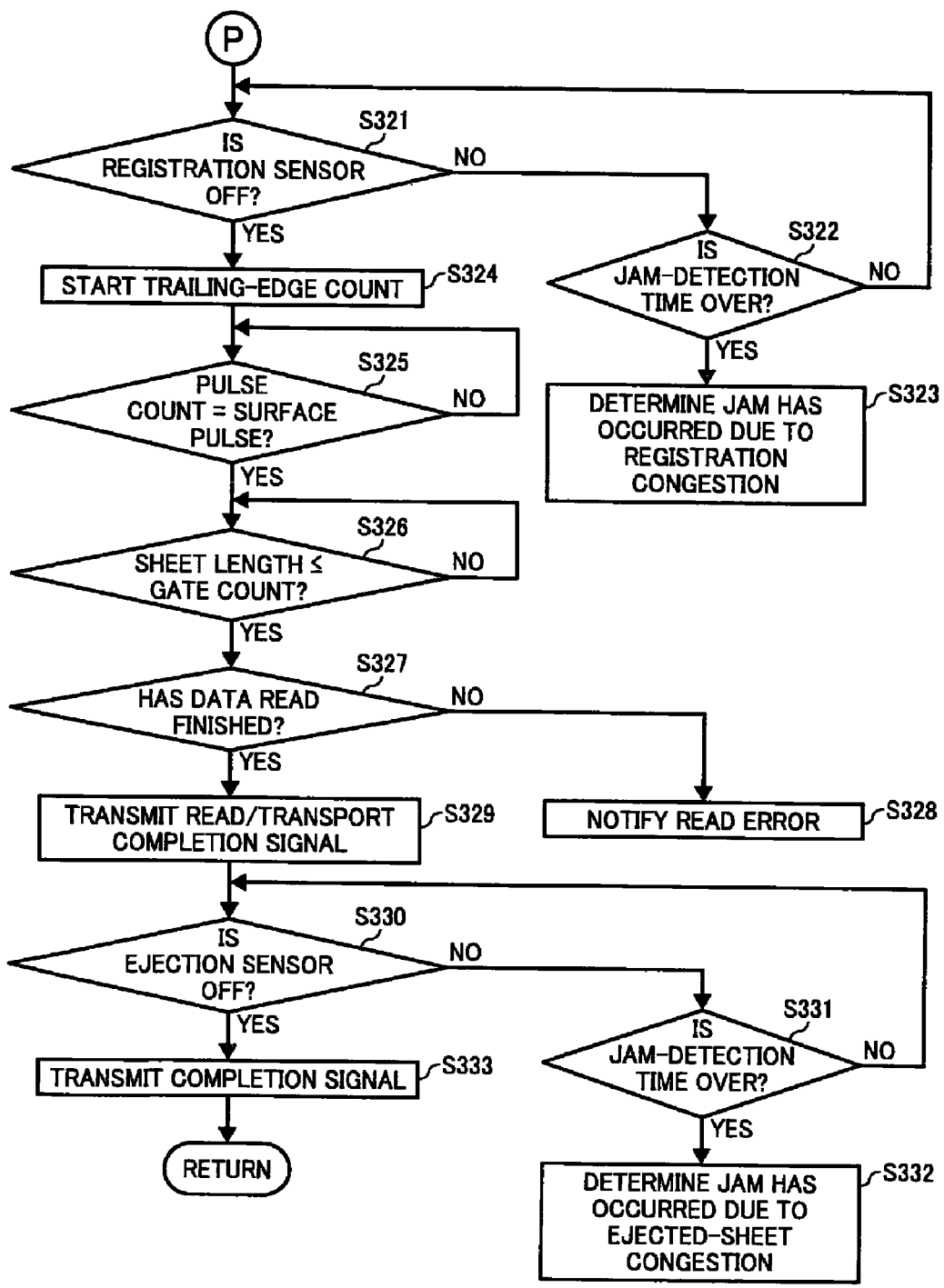

On the other hand, when determining that the ejection sensor 50 is ON at step S318, as shown in FIG. 15, the controller 100 determines whether the registration sensor 41 is OFF (step S321). When the registration sensor 41 is not OFF (No at step S321), the controller 100 determines whether the jam-detection time is over (step S322). When the jam-detection time is over (YES at step S322), the controller 100 determines that it is due to a registration-congestion jam, and displays jam notification on the display unit 48 (step S323).

When the registration sensor 41 is OFF (YES at step S321), the controller 100 starts trailing-edge count for counting the pulse of the read motor 103 (step S324). The controller 100 determines whether the pulse count of the read motor 103 has reached the surface pulse (step S325). When the pulse count has reached the surface pulse (YES at step S325), the controller 100 compares the gate count with the sheet length (step S326).

When the gate count is equal to or larger than the sheet length (YES at step S326), the controller 100 determines whether the communication reader 81" has finished data read (step S327). Specifically, the main-body controller 111 transmits a signal indicating read completion of the full-page electronic data of the e-paper to the controller 100. When the communication reader 81" has not finished data read at step S327, the controller determines that it is due to a read error, and displays error notification on the display unit 48 (step S328).

On the other hand, when the communication reader 81" has finished data read (YES at step 5327), the controller 100 transmits a signal indicating completion of read and transport of the e-paper to the main-body controller 111 (step S329). The controller 100 determines whether the ejection sensor 50 is OFF (step S330). When the ejection sensor 50 is not OFF (No at step S330), the controller 100 determines whether the jam-detection time is over (step S331).

When the jam-detection time is over (YES at step S331), the controller 100 determines that it is due to a jam caused by ejected-sheet congestion, and displays jam notification on the display unit 48 (step S332). When the ejection sensor 50 is OFF (YES at step S330), the controller 100 transmits a signal indicating that sheet-ejection is complete to the main-body controller 111 (step S333), and the process ends.

In the case of a two-sided mode, after read of one side is complete, the inversion solenoid 105 is turned on, before the leading edge of the sheet having passed through the read position 80 reaches the lower ejection driven roller 42, to switch the switching claw 44 to the position indicated by two-dot chain line in FIG. 2, thereby rotating the inversion motor 104 normally. The sheet is carried on the switchback path 46a as shown by arrow B in FIG. 2 due to the normal rotation. Thereafter, the switching claw 44 is switched to the position indicated by solid line in FIG. 2 to reversely rotate the inversion motor 104, so that the sheet is carried to the re-feed path 46b as shown by arrow C in FIG. 2. Thus, the temporarily switched-back sheet, whose one side has been read, is re-carried to the read position 80, so that the other side is read. To sort the page sequence, the sheet after read of two sides is carried again to the switchback path 46a to reverse the sheet via the re-feed path 46b, and ejected onto the lower ejection driven-roller tray without performing read at the read position 80. That is, in the case of the two-sided mode, the sheet passes the read position 80 three times and is ejected.

Figure 16:
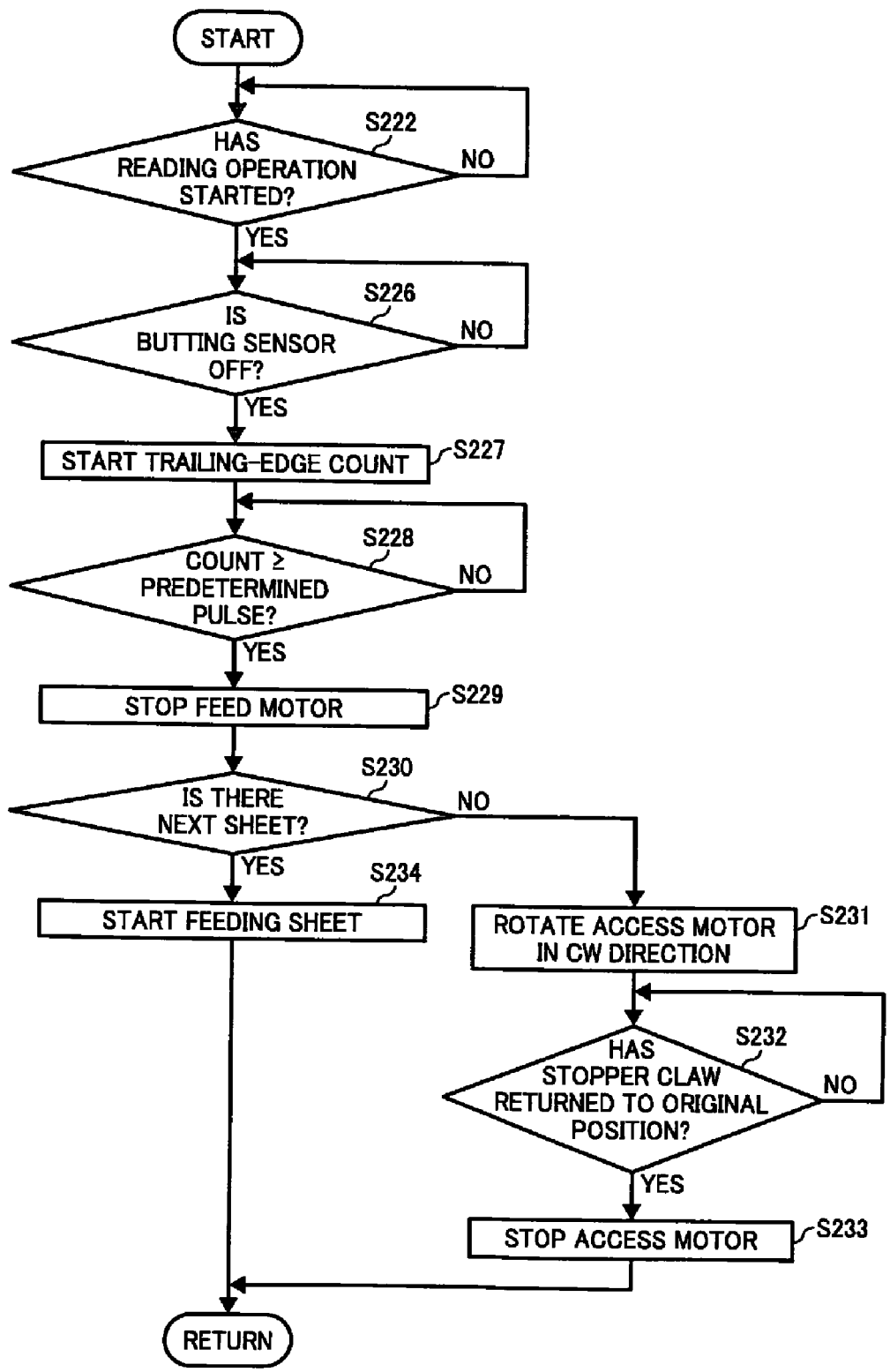
FIG. 16 is a flowchart of pre-feed operation for the next document according to the first embodiment.

FIG. 16 is a flowchart of pre-feed operation for the next sheet. As shown in FIG. 16, the controller 100 receives a read-start signal from the main-body controller 111 to determine whether the reading operation has started (step S222). In the one-sided mode, either or both paper medium and e-paper can be transported.

The controller 100 determines whether the butting sensor 35 is OFF (step S226). When the butting sensor 35 is OFF (YES at step S226), the controller 100 starts trailing-edge count for counting the drive pulse of the feed motor 102 after the butting sensor 35 detects the trailing edge of the previous sheet (step S227).

The controller 100 determines whether the count has reached a predetermined pulse (step S228). The predetermined pulse is set to the drive pulse of the feed motor 102 since the trailing edge of the sheet was detected by the butting sensor 35 until the sheet passes through the pullout roller pair 36.

When the count has reached the predetermined pulse or more at step S228, the controller 100 stops the reverse rotation of the feed motor 102 (step S229) to determine whether there is the next sheet on the table 24 (step S230).

When there is the next sheet on the table 24 (YES at step S230), the controller 100 performs the process described previously in connection with FIGS. 9 to 11 to feed the next sheet (step S234). When there is no next sheet at step S230, the controller 100 rotates the access motor 101 in the CW direction (step S231) to move the stopper claw 28 to the position indicated by two-dot chain line in FIG. 2 (step S232), and stops rotation of the access motor 101 (step S233).

To sum it up, the copier 21 includes the ADF 23, the detector 802, the controller 100, the communication reader 81", the optical reader 81', the main-body controller 111. The e-paper 900 includes the e-paper display unit 904 on which an image is displayed, the IC-chip memory cell 902d that stores therein the electronic data of the image, and the antenna coil 901 for communicating with an external device. A carrier unit carries any one of the e-paper 900 and a paper medium or both to the read position 80. The detector 802 includes the antenna 802a, and communicates with a sheet to determine whether the sheet is e-paper or a paper medium. The controller 100 controls transport by the ADF 23 based on a detection result obtained by the detector 802. The communication reader 81" includes the antenna 81g, and reads the electronic data stored in the IC-chip memory cell 902d at the read position 80. The optical reader 81' optically reads the image on a paper medium at the read position 80 to obtain electronic data. The main-body controller 111 controls reading operation performed by the optical reader 81' and the communication reader 81" based on the detection result. The access roller 31, the feed belt 32, the reverse roller 33, the pullout roller pair 36, and the like constitute the carrier unit.

Not only the paper medium but also the e-paper can be carried to the read position 80 by the ADF 23, so that the electronic data can be obtained without degrading the image quality by the communication reader 81", or the display image on the e-paper can be optically read by the e-paper display unit 904. The medium type can be discriminated based on the detection information by the detector 802, and the e-paper and the paper medium can be carried to the read position based on the discrimination result. At this transport, the transport pressure, the transport speed, and the like are changed based on the medium type.

As described above, according to the first embodiment, the main-body controller 111 makes the optical reader 81' optically read the image on the paper medium at the read position 80, and makes the communication reader 81" read the electronic data of the e-paper. Accordingly, an appropriate reader can be selected based on the medium type.

The detector 802 is arranged near the transport path on the upstream side in the transport direction relative to the volume detector 801 and the communication reader 81". With this configuration, sufficient process time can be obtained since discrimination of the medium type till switching to transport control different from that of the paper medium.

The volume detector 801 includes the antenna 801a to communicate with the e-paper 900, and detects the volume of the electronic data stored in the e-paper 900. The main-body controller 111 (or the controller 100) functions as a read-time calculator that calculates communication time required when the communication reader 81" reads the electronic data based on the volume information detected by the volume detector 801. The controller 100 also functions as a transport controller that controls transport of the e-paper based on the required communication time. Thus, appreciate transport control can be performed according to the volume of the electronic data stored in the e-paper.

The controller 100 controls the transport speed of the e-paper by the ADF 23 during the read based on the required communication time calculated by the main-body controller 111. For example, when the required communication time is longer than the predetermined time, the controller 100 decreases the transport speed during read and transport as compared with the paper medium, thereby ensuring the required communication time.

The volume detector 801 is arranged near the transport path on the upstream side in the transport direction relative to the read position 80 and the communication reader 81". With this configuration, because the detector 802 is provided near the transport path, the distance with the e-paper carried on the transport path can be reduced to reduce power consumption for communication. Besides, sufficient process time can be obtained since calculation of the required communication time based on the volume of the e-paper until switching to appropriate transport control different from that of the paper medium.

The communication reader 81" is shifted by the first and the second carriers in the predetermined range below the exposure glass 22a to read the e-paper placed on the exposure glass 22a. Thus, the electronic data of the e-paper can be read in a batch even in a fixed read method. This is suitable for effectively reading small amount of e-paper (e.g., one).

The photoconductor drum 83, the developing apparatus 86, and the like form an image on a predetermined recording sheet based on the electronic data obtained by the communication reader 81" or the optical reader 81'. With this configuration, the copier 21 can read both e-paper and a paper medium, and form an image on a transfer sheet.

The controller 100 realizes a discrimination control function for discriminating between the e-paper 900 having the above configuration and the paper medium based on the detection information from the detector 802. The controller 100 also realizes a transport control function for controlling the ADF 23 to carry the e-paper or the paper medium to the read position 80. Moreover, the controller 100 realizes a read control function for controlling the communication reader 81" to read the electronic data stored in the e-paper 900 at the read position 80 as well as a read control function for controlling the optical reader 81' to optically read the image on the paper medium at the read position 80. Thus, both of the paper medium and the e-paper can be read. Transport to the read position can be performed according to the medium type.

Furthermore, the controller 100 realizes a volume-detection control function for controlling the volume detector 801 to communicate with the e-paper 900, thereby detecting the volume of the electronic data stored in the e-paper 900. Likewise, the controller 100 realizes a required-time calculation function to calculate communication time required for the communication reader 81" to read the electronic data based on the volume of the electronic data detected by the volume-detection control function. The controller 100 further realizes a transport-speed control function for controlling transport speed of the e-paper by the ADF 23 based on the required communication time calculated by the read-time calculation function. Thus, appropriate transport speed can be set based on the volume of the electronic data stored in the e-paper.

The e-paper 900 includes the e-paper display unit 904 for displaying an image for each page, the IC-chip memory cell 902d that stores therein electronic data divided by page, the antenna coil 901 for communicating with an external device, and the communication control circuit 902c. Accordingly, the full-page electronic data is transmitted in response to a signal from the communication reader 81". With this configuration, the communication reader 81" can read the full-page electronic data in a batch by a transport operation for one sheet, thereby enabling to realize efficient read and transport by the ADF 23.

The IC-chip memory cell 902d in the e-paper 900 stores therein the volume information indicating the volume of the full-page electronic data, and transmits the volume information in response to a signal from the volume detector 801. The controller 100 calculates the required communication time for the communication reader 81" based on the volume information, to set the transport speed of the ADF 23. Thus, appropriate transport control can be performed according to the medium type and the volume.

In the first embodiment, an example is explained in which different transport-control process is performed for e-paper and a paper medium according to the medium type. However, for example, when e-paper and a paper medium are consolidated, the main-body controller 111 can function as a read controller that controls the communication reader 81" and the optical reader 81' to perform reading operation. When reading operation by both the communication reader 81" and the optical reader 81' is successful, the main-body controller 111 discards the image read by the optical reader 81'. For example, when two-page electronic data is stored in the e-paper, read is performed by the optical reader 81' as in the case of the paper medium. Therefore, to perform read by the optical reader 81' as in the paper medium, upon completion of optical read of one page displayed on the surface of the e-paper, the e-paper is carried to the switchback path 46a, reversed through the switchback path 46a, and allowed to pass through the read position 80 without performing read. The e-paper is then turned inside out through the switchback path 46a to change the displayed page, so that the second page is optically read.

For example, the process at step S8 in FIG. 9, the process at step S35 in FIG. 12, and the process in FIGS. 14 and 15 can be omitted. Further, a process for requesting page update of the e-paper 900 can be provided instead of the process at step S28 in FIG. 11. Similarly, a last-page checking process can be provided instead of the process at step S327 in FIG. 15. A page update unit can be provided instead of or in addition to the volume detector 801. The page update unit has an antenna (corresponding to 801a in FIG. 5), a communication controller (corresponding to 801b in FIG. 6), and a storage unit (e.g., IC-chip memory cell) for storing the current page number information and the page counter. The page update unit transmits a signal requesting page update and volume update for each page to the e-paper 900, and receives and stores page number (page information) and volume (volume information) after the update transmitted from the e-paper 900. The updated page number and volume information is transmitted to the controller 100 and the main-body controller 111.

The e-paper 900 updates the displayed page on the e-paper display unit 904 and the display in the display areas 908 and 909 in response to a signal from the page update unit, and transmits a signal indicating the display content in the updated display areas 908 and 909 to the page update unit.

The controller 100 (or the main-body controller 111) calculates the required communication time for the communication reader 81" based on the updated volume information, and the controller 100 controls the transport speed based on the required communication time. For example, when the transport speed is lower than the transport speed of the paper medium, the controller 100 transports the both media at the transport speed set based on the required communication time. The main-body controller 111 determines whether the page is the last page based on the updated page information, and when the page is the last page, transmits a predetermined signal to the controller 100. The controller 100 performs the checking process of the last page based on whether the predetermined signal has been received, to notify the main-body controller 111 of completion of read and transport. The main-body controller 111 preferentially processes the electronic data read by the communication reader 81".

With this configuration, electronic data for each page can be read by the communication reader 81", while performing the same transport control as in a case that the paper medium is optically read by the optical reader 81'. Accordingly, the transport control process can be simplified, the required communication time for the communication reader 81" can be equalized to avoid a read error, and degradation of the image quality can be reduced.

In the first embodiment, the transport speed is controlled by the controller 100 based on the calculated required communication time. However, transport of the e-paper by the ADF 23 is suspended at the read position, and after the total volume of the e-paper is read by the communication reader 81", the transport can be resumed.

With this configuration, the electronic data of the e-paper can be obtained reliably, while suppressing power consumption by the communication reader 81". Further, because the e-paper is carried again after the total volume of the e-paper has been read, interruption of read operation due to a read error can be reduced. When the transport of the sheet is suspended, the timing of re-transport is determined by agreement of the volume of the full-page electronic data obtained based on the detection information by the detector 802 with the volume of electronic data read by the communication reader 81".

In the first embodiment, the detector 802 is provided at one place near the access roller 31. However, a plurality of detectors can be provided upstream of the communication reader 81" and the volume detector 801 in the transport direction. With this configuration, reliability of the copier 21 can be improved corresponding to unreliable detection of the detector 802.

In the first embodiment, the detector 802 communicates with the e-paper 900 to obtain the medium-type information. However, the e-paper and the paper medium can be discriminated from each other by an existing optical sensor (e.g., the separation sensor 51) based on a difference in reflectivity between the polymer film constituting the e-paper 900 and the paper medium. With this configuration, the medium type can be detected without adding new parts. Alternatively, a predetermined bar code can be provided on the display face or at the peripheral edge of the e-paper 900, and a barcode reader can be arranged instead of the detector 802. With this configuration, the medium type can be detected based on the presence of the barcode.

In the first embodiment, the butting operation and the registration suspending operation are performed relative to the paper medium and the e-paper to correct a skew. However, at the time of reading the e-paper by the communication reader 81", the butting operation and the registration suspending operation may not be performed to increase the transport speed. This is because the skew does not have a large influence on the read of the e-paper by communication.

Figure 17:
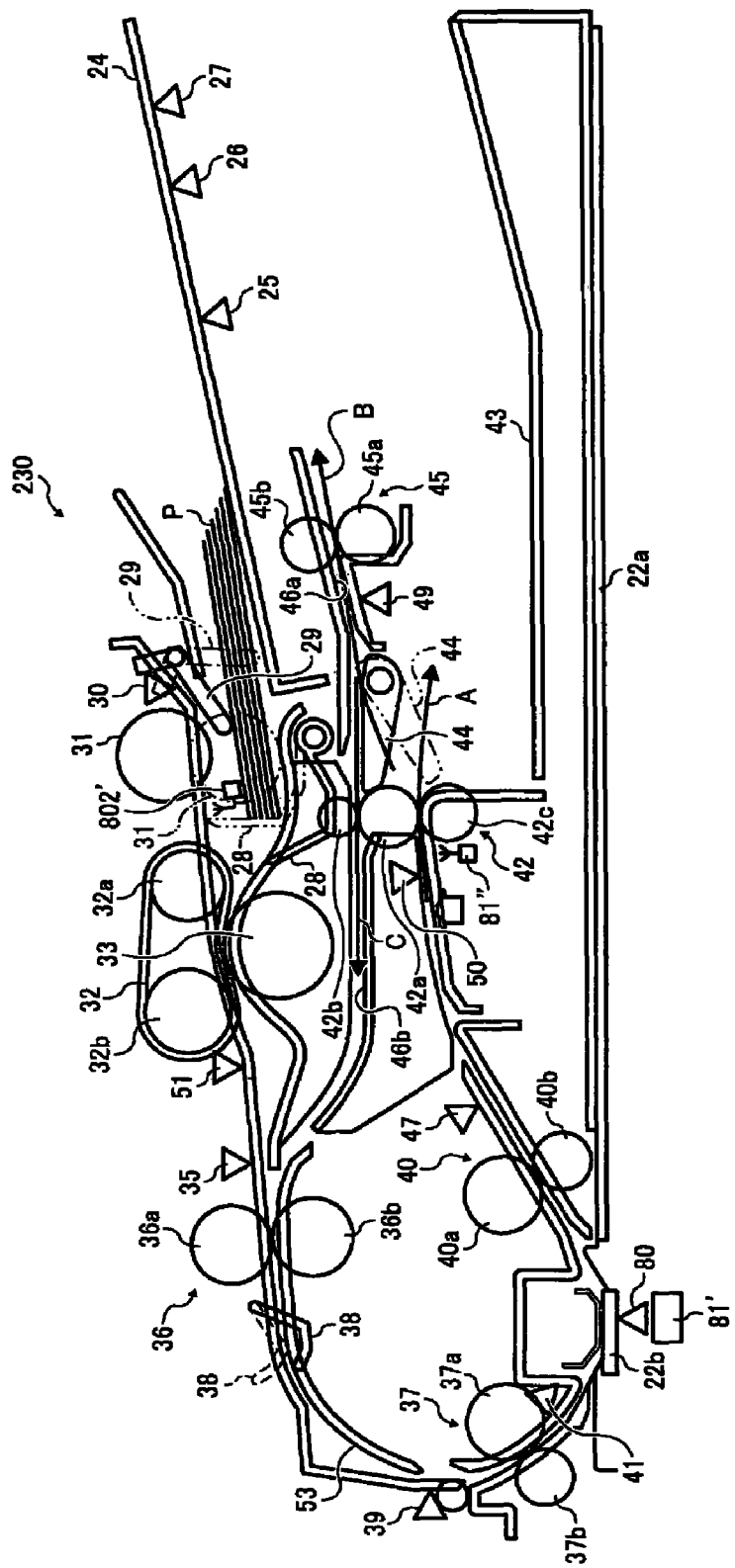
FIG. 17 is a schematic diagram of an ADF according to a second embodiment of the present invention.

FIG. 17 is a schematic diagram of an ADF 230 according to a second embodiment of the present invention. The ADF 230 is of basically the same configuration as the ADF 23 except for a detector 802' and the position of the communication reader 81". Therefore, the same explanation is not repeated. Incidentally, like reference numerals refer to corresponding portions throughout the drawings.

Figure 18:
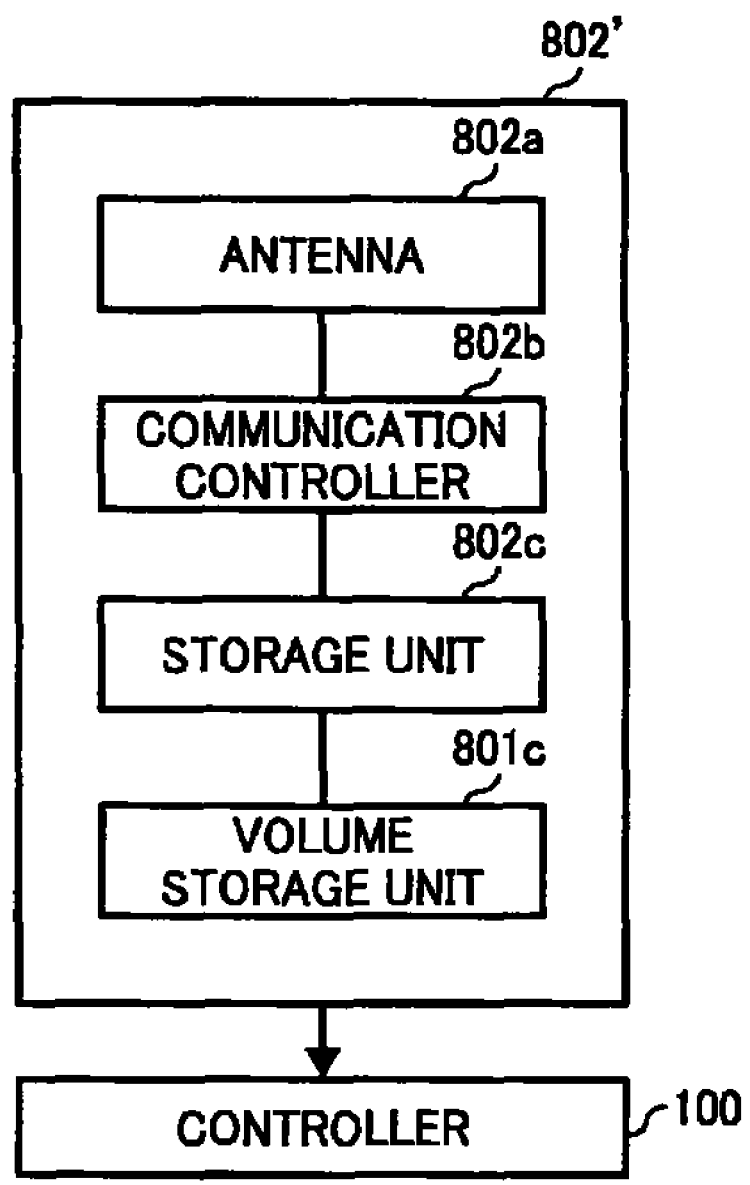
FIG. 18 is a block diagram of a detector shown in FIG. 17.

As just described, the ADF 230 includes the detector 802' in place of the detector 802. FIG. 18 is a block diagram of the detector 802'. The detector 802' has both the medium-type detection function of the detector 802 and the volume detection function of the volume detector 801, and is arranged near the transport path on a downstream side of the access roller 31 in the transport direction. The detector 802' includes the antenna 802a, the communication controller 802b, the storage unit 802c, and the volume storage unit 801c. The antenna 802a includes, for example, the coil antenna, generates the magnetic field relative to the e-paper 900, and supplies the electromotive force due to electromagnetic coupling. A predetermined signal is transmitted to the e-paper 900 via the antenna 802a. The communication controller 802b includes a modulation/demodulation circuit and a communication control circuit to transmit a signal modulated according to a modulation scheme such as ASK, FSK, and PSK (e.g., a signal requesting medium-type information indicating a medium type and a signal requesting volume information indicating the volume of the full-page electronic data) to the e-paper 900, and demodulate a signal from the e-paper 900 (e.g., signals of medium-type information and volume information). The storage unit 802c stores therein the medium-type information obtained by demodulating the medium-type information signal transmitted from the e-paper 900. The volume storage unit 801c stores therein the volume information obtained by demodulating the signal indicating the volume information transmitted from the e-paper 900. The controller 100 discriminates between the e-paper 900 and the paper medium based on the medium-type information. The controller 100 calculates the required communication time when the communication reader 81" reads the full-page electronic data based on the volume information, and calculates the transport speed of the read motor 103 based on the required communication time.

As shown in FIG. 17, the communication reader 81" is arranged between the read position 80 of the optical reader 81' and the lower ejection driven-roller tray 43. The optical reader 81' and the communication reader 81" are formed independently. By providing the communication reader 81" on the ADF 230 side, control of the communication reader 81" is performed by the controller 100. Further, maintenance of the mechanical unit of the ADF 230 and the communication reader 81" can be performed together. In the read operation by the communication reader 81", because there is no influence of the transport skew, control can be performed such that the butting operation for correcting the skew and the registration suspension on the upstream side of the read position 80 are not performed. In this case, when the sheet is carried to the lower ejection driven-roller tray 43 without causing a jam due to the transport skew, for example, read by communication can be reliably performed near the ejection roller 42. Because read of the e-paper is performed downstream of the read position 80 in the transport direction, an influence on the transport of the next sheet can be reduced.

Figure 19:
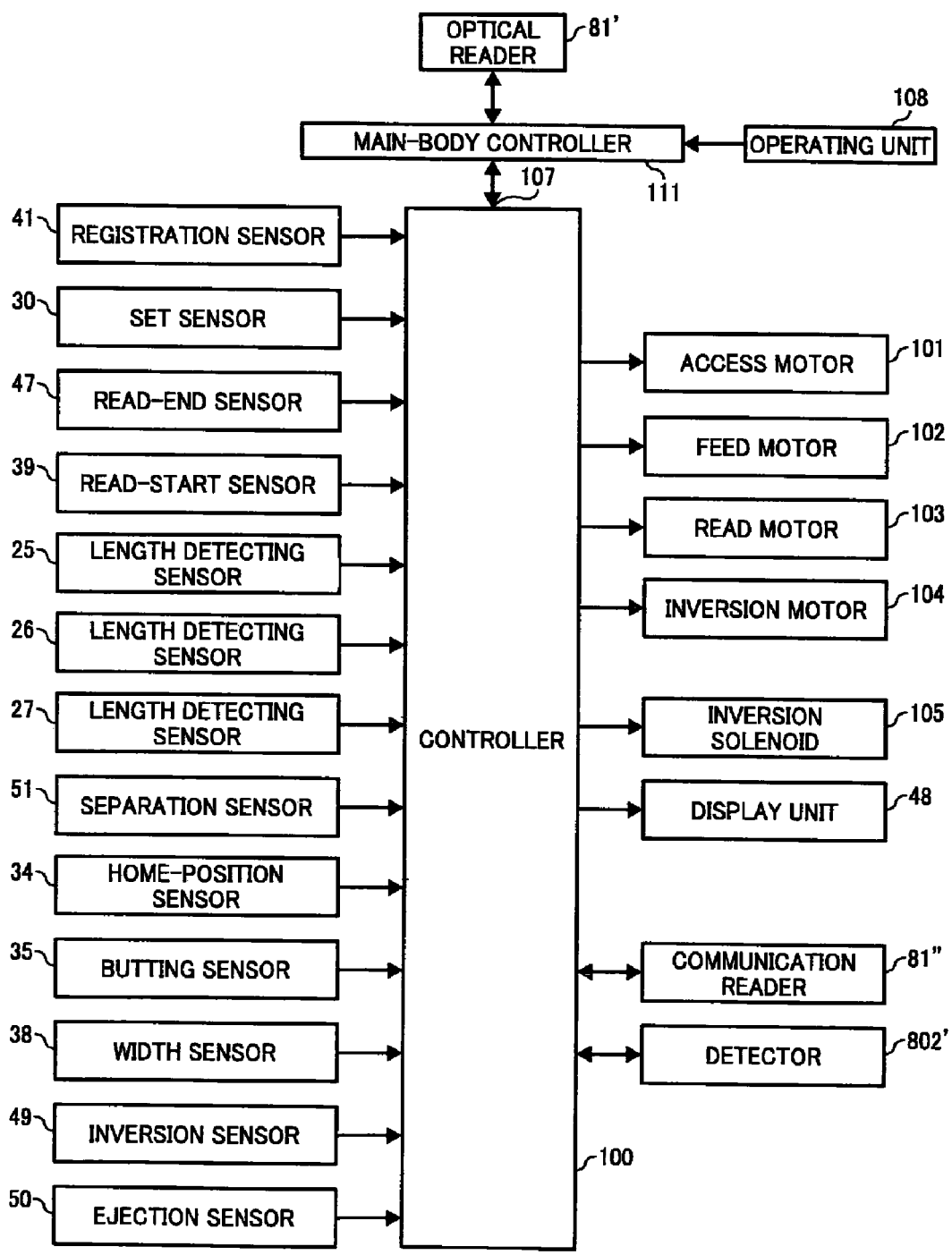
FIG. 19 is a block diagram of a control system of the ADF shown in FIG. 17.

FIG. 19 is a block diagram of the control system in the ADF 230. The controller 100 obtains the medium-type information and the volume information detected by the detector 802' to perform transport control and read control by the communication reader 81". The butting operation for correcting the skew and the registration suspension on the upstream side of the read position 80 are not performed. Further, the required communication time for the communication reader 81" is calculated based on the volume information, the transport speed at the time of read is set based on the required communication time, and read is started near the ejection roller 42.

As shown in FIG. 19, the optical reader 81' is connected to the main-body controller 111, and the communication reader 81" is connected to the controller 100. The electronic data of the e-paper 900 obtained by the communication reader 81" is transmitted to the main-body controller 111 via the controller 100.

FIGS. 20 to 24 are flowcharts of transport-control process for transporting a sheet controlled by the controller 100. In the following, the process in one-sided mode is explained as an example, in which one side of a sheet (paper medium, e-paper, etc.) is read and transported.

Figure 20:
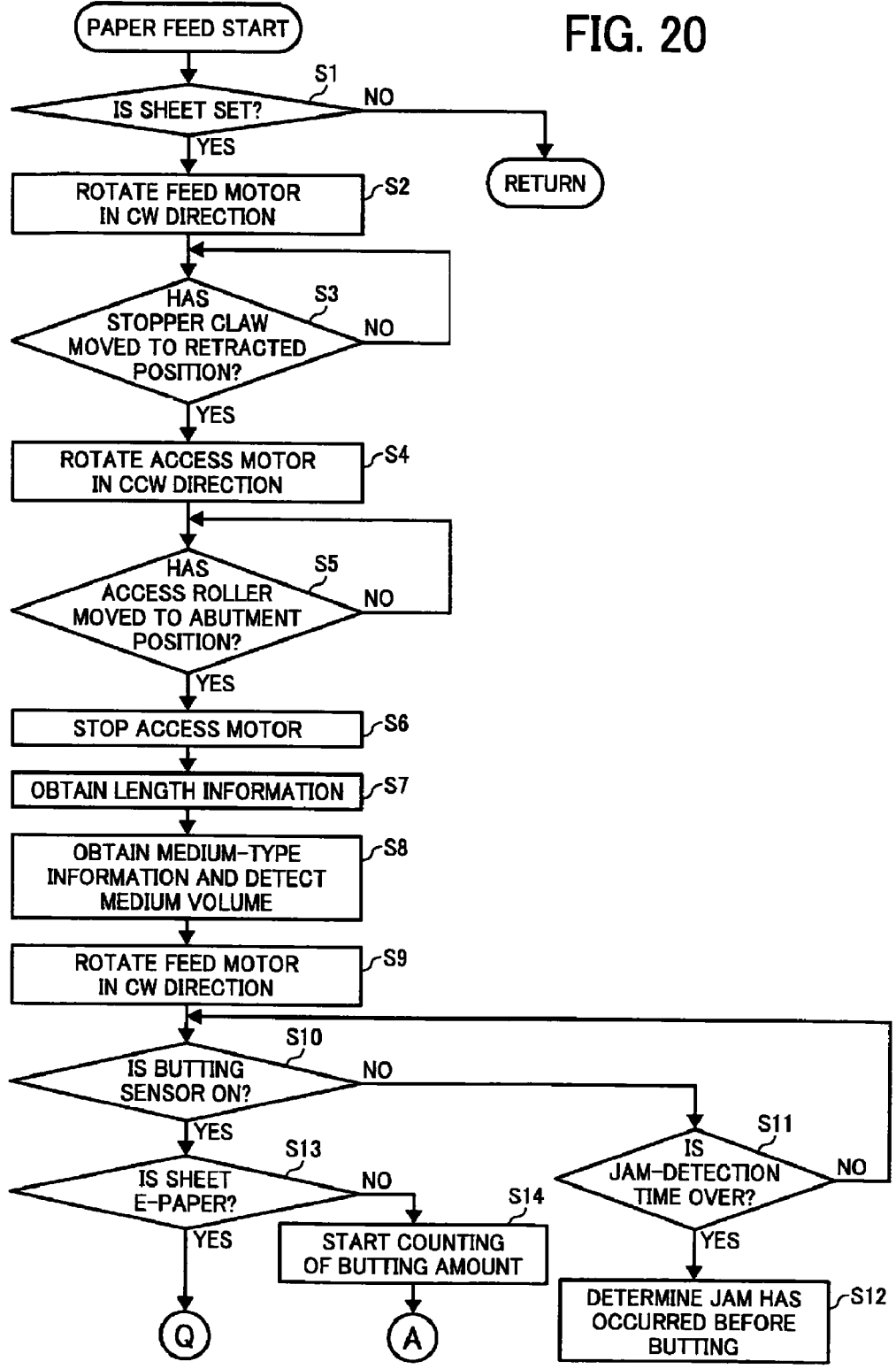
FIGS. 20 to 24 are flowcharts of transport-control process according to the second embodiment.

In FIG. 20, the process preformed from steps S1 to S7 are the same as that preformed from steps S1 to S7 in FIG. 9 previously explained in the first embodiment, and the same explanation is not repeated.

After obtaining the length information at step S7, the controller 100 obtains the medium-type information and the volume information of the e-paper based on the detection information by the detector 802' (step S8). Specifically, the controller 100 instructs the detector 802' to transmit a predetermined signal (signal requesting the medium-type information indicating the medium type) to the sheet. When there is a response thereto, the controller 100 instructs the detector 802' to transmit a predetermined signal (signal requesting the volume information indicating the full-page electronic data stored in the e-paper), thereby obtaining the medium-type information and the volume information. The controller 100 then rotates the feed motor 102 in the CW direction (step S9). Accordingly, after the one being uppermost on a stack of sheets P is separated from the stack by the access roller 31, the uppermost sheet is separated by the feed belt 32 and the reverse roller 33.

The controller 100 determines whether the butting sensor 35 is ON (step S10). When the butting sensor 35 is not ON (No at step S10), the controller 100 determines whether the jam-detection time is over (step S11). When the jam-detection time is over (YES at step S11), the controller 100 determines that a jam has occurred before the position of the butting sensor 35, and displays jam notification on the display unit 48 (step S12).

On the other hand, when determining that the butting sensor 35 is ON at step S10, the controller 100 determines whether the sheet is e-paper based on the medium-type information obtained at step S8 (step S13). When the sheet is not e-paper (No at step S13), the controller 100 counts the butting amount (step S14). That is, the controller 100 starts counting of the drive pulse of the feed motor 102 corresponding to the distance Xmm set larger than the distance between the butting sensor 35 and the pullout roller pair 36.

Figure 21:
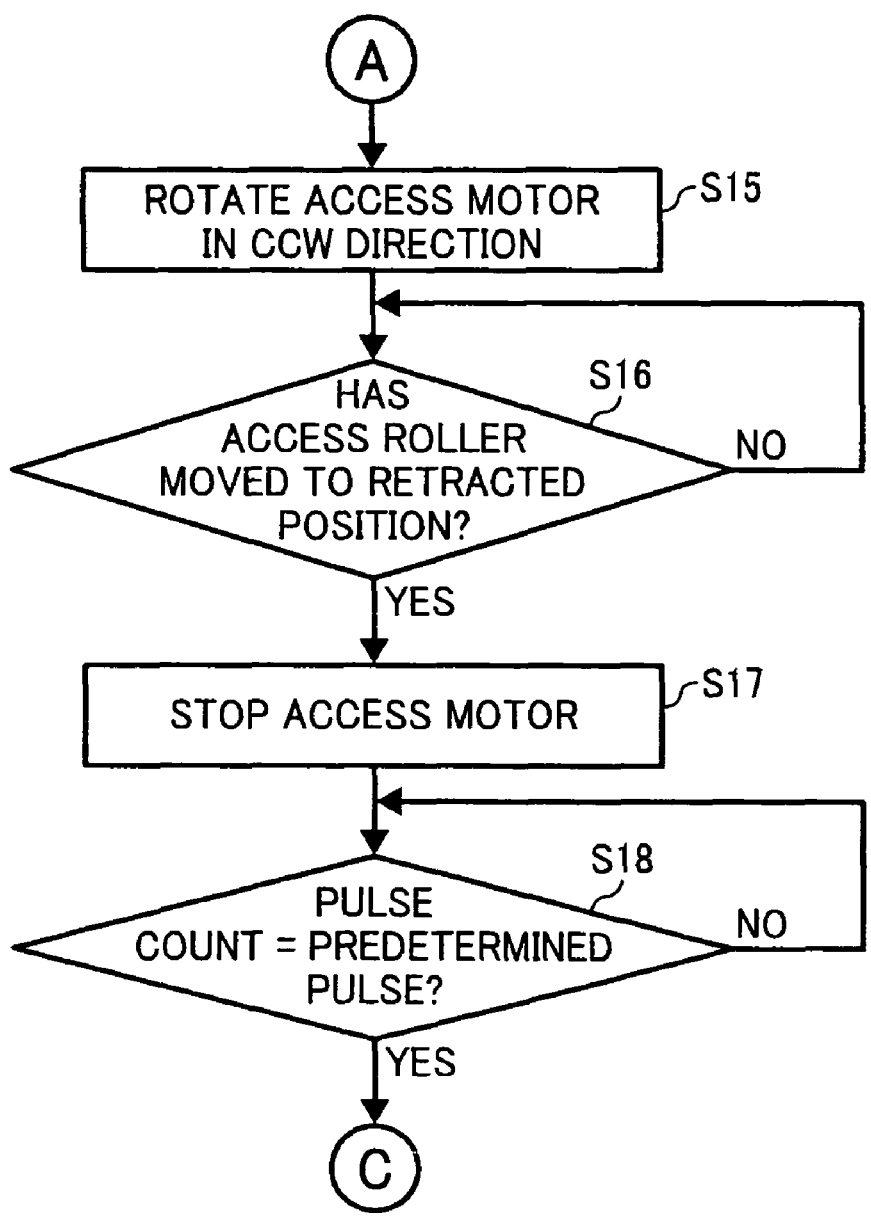
Figure 22:
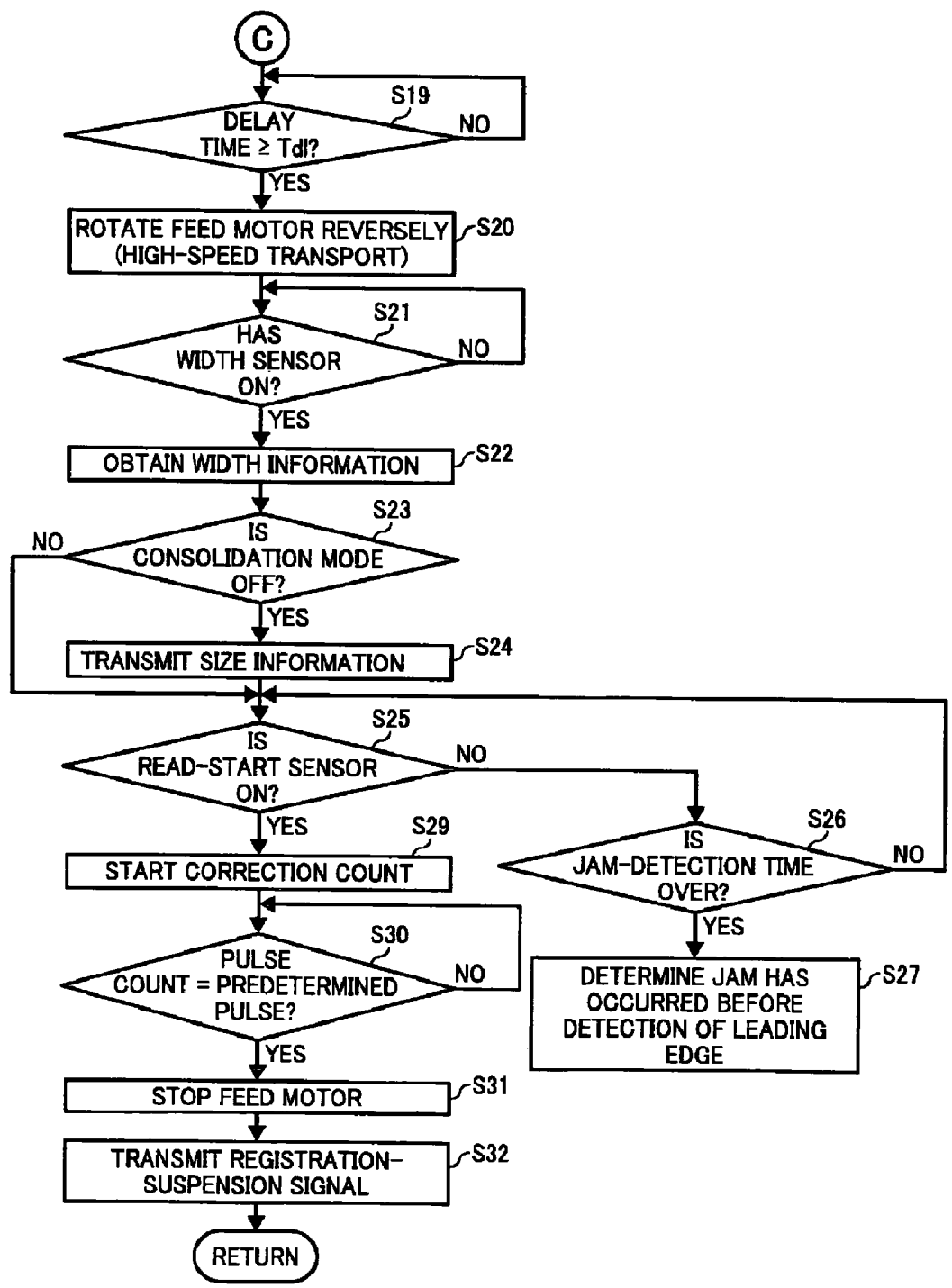
Figure 23:
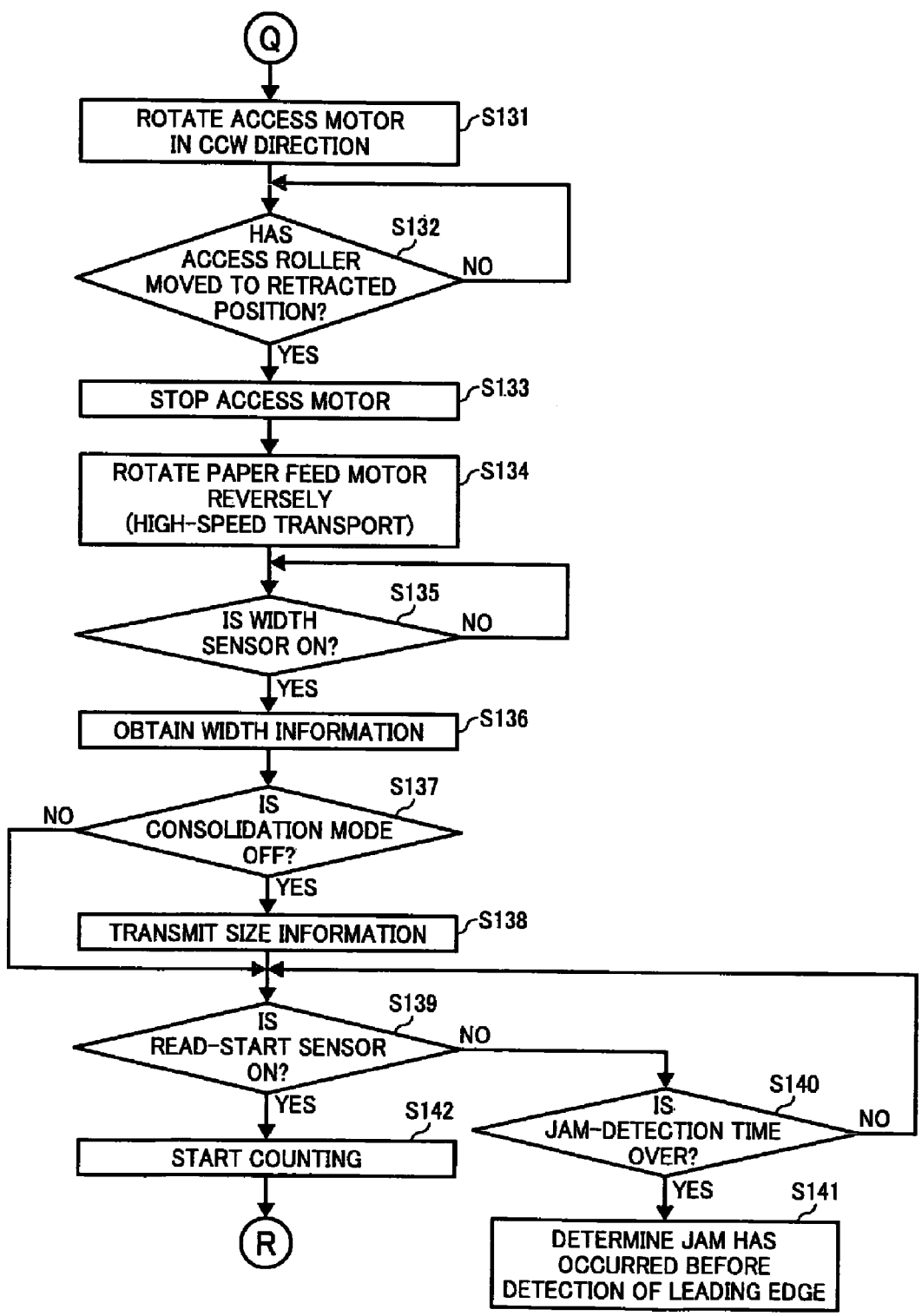

The process control proceeds to step S15 in FIG. 21. The process performed from steps S15 to S18 corresponds to that performed from steps S14 to 17 previously explained in connection with FIG. 10, and the same explanation is not repeated. In addition, the process performed from steps S19 to S27 in FIG. 22 corresponds to that performed from steps S19 to S27 previously explained in connection with FIG. 11, and the same explanation is not repeated.

When determining that the read-start sensor 39 is ON at step S25, the controller 100 starts counting of the butting-amount correction (step S29). Subsequently, the controller 100 determines whether the pulse count of the feed motor 102 has reached a predetermined pulse corresponding to the butting amount Ymm (step S30). When the pulse count has reached the predetermined pulse, the controller 100 stops the feed motor 102 (step S31), transmits a registration-suspension signal to the main-body controller 111 (step S32), and finishes transport to the read position 80.

On the other hand, when determining that the sheet is e-paper at step S13, the controller 100 reversely rotates the access motor 101 in the CCW direction (step S131), and determines whether the access roller 31 has moved to the retracted position (step S132). When the access roller 31 has moved to the retracted position (YES at step S132), the controller 100 stops the access motor 101 (step S133).

The controller 100 drives the feed motor 102 at high speed (step S134). When the feed motor 102 is reversely rotated, the pullout roller pair 36 is driven. However, the driving force is not transmitted to the access roller 31 and the feed belt 32 due to the operation of the one-way clutch of the pulley 140. Accordingly, the sheet is carried by the pullout roller pair 36.

The controller 100 determines whether the width sensor 38 is ON (step S135). When the width sensor 38 is ON (YES at step S135), the controller 100 obtains the width information of the sheet based on the detection information from the width sensor 38 (step S136).

At this time, the sheet is sandwiched between the pullout roller pair 36 and the read-start roller pair 37 and carried toward the read position 80. Because the sheet-transport speed is set high, processing time for feeding the sheet from the read position 80 to downstream side can be reduced. Specifically, for the second and subsequent sheets, an interval between feeding of sheets is reduced due to the high-speed transport, and therefore, productivity can be improved.

The controller 100 determines whether the consolidation mode is OFF (step S137). When the consolidation mode is OFF (Yes at step S137), the controller 100 transmits the size information of the sheet on the table 24 to the main-body controller 111 (step S138).

The controller 100 determines whether the leading edge of the sheet has been detected by the read-start sensor 39, i.e., the read-start sensor 39 is ON (step S139). When the read-start sensor 39 is not ON (NO at step S139), the controller 100 determines whether the jam-detection time is over (step S140). When the jam-detection time is over (YES at step S140), the controller 100 determines that a jam has occurred before the leading edge of the sheet is detected, and displays jam notification on the display unit 48 (step S141).

On the other hand, when determining that the read-start sensor 39 is ON at step S139, the controller 100 stops the feed motor, and starts counting for driving the read motor 103 (step S142).

Figure 24:
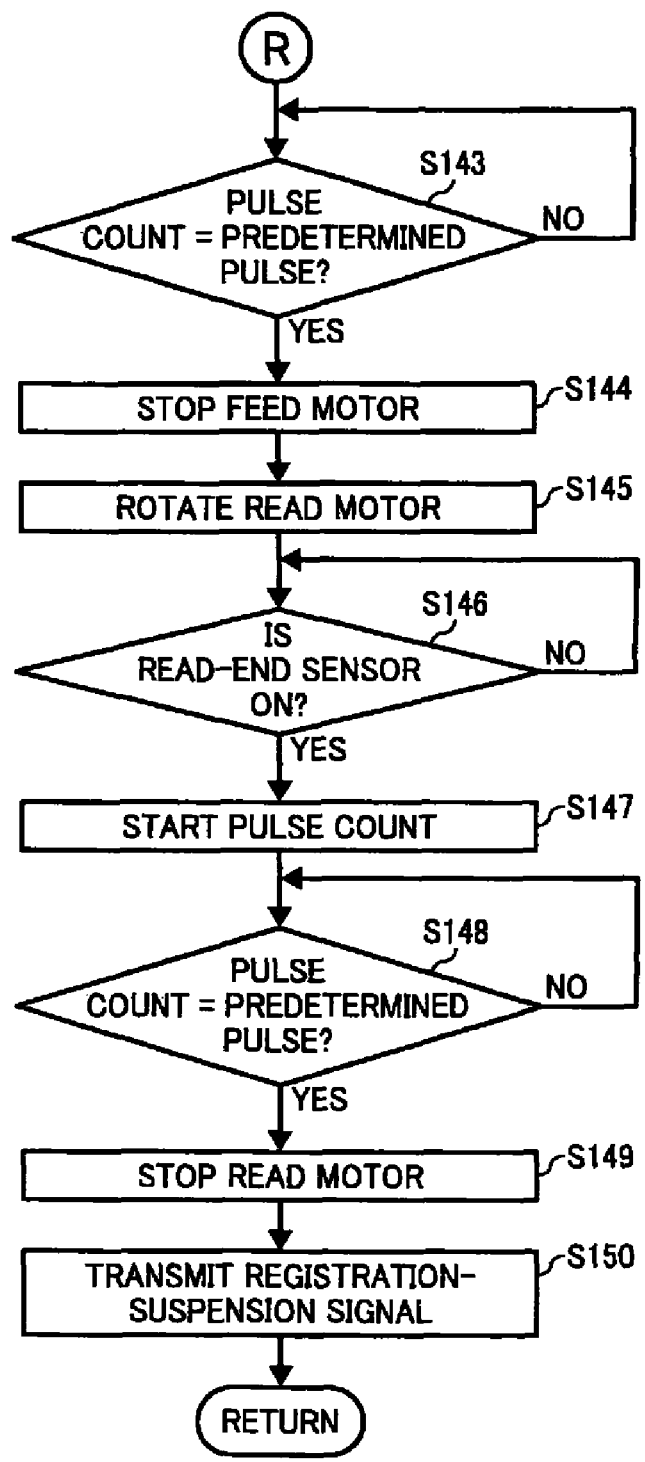

As shown in FIG. 24, the controller 100 determines whether the pulse count has reached the predetermined pulse corresponding to the stop position of the feed motor 102 (position for starting read and transport) (step S143). When the pulse count has reached the predetermined pulse (YES at step S143), the controller 100 stops the feed motor 102 (step S144).

The controller 100 rotates the read motor 103 to drive the read-start roller pair 37 and the read-end roller pair 40 at a higher speed than that at the time of read (step S145). This is to perform read by communication on the downstream side of the read position 80. The controller 100 determines whether the leading edge of the sheet has been detected by the read-end sensor 47, i.e., the read-end sensor 47 is ON (step S146). When the leading edge of the sheet has been detected (YES at step S146), the controller 100 starts correction count or pulse count of the read motor 103 (step S147).

The controller 100 determines whether the pulse count of the read motor 103 has reached a predetermined pulse corresponding to the distance between the read-end sensor 47 and the read-start position (not shown) by the communication reader 81" (step S148). The read-start position is set between the read-end sensor 47 and the ejection sensor 50.

When the pulse count has reached the predetermined pulse (YES at step S148), the controller 100 stops the read motor 103 (step S149), and transmits the registration-suspension signal to the main-body controller 111 (step S150).

Figure 25:
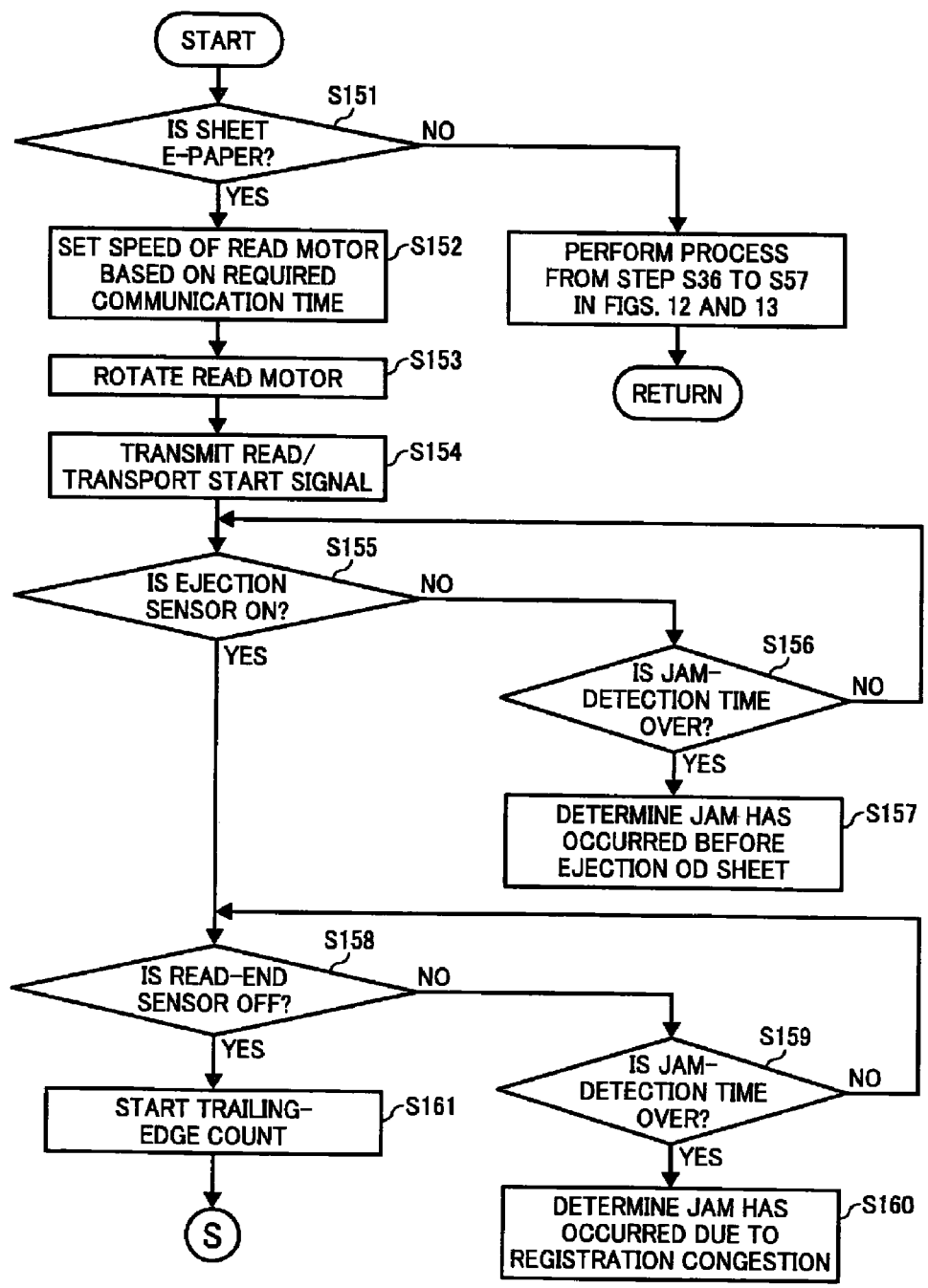
FIGS. 25 and 26 are flowcharts of transport-control process performed after reading starts according to the second embodiment.
Figure 26:
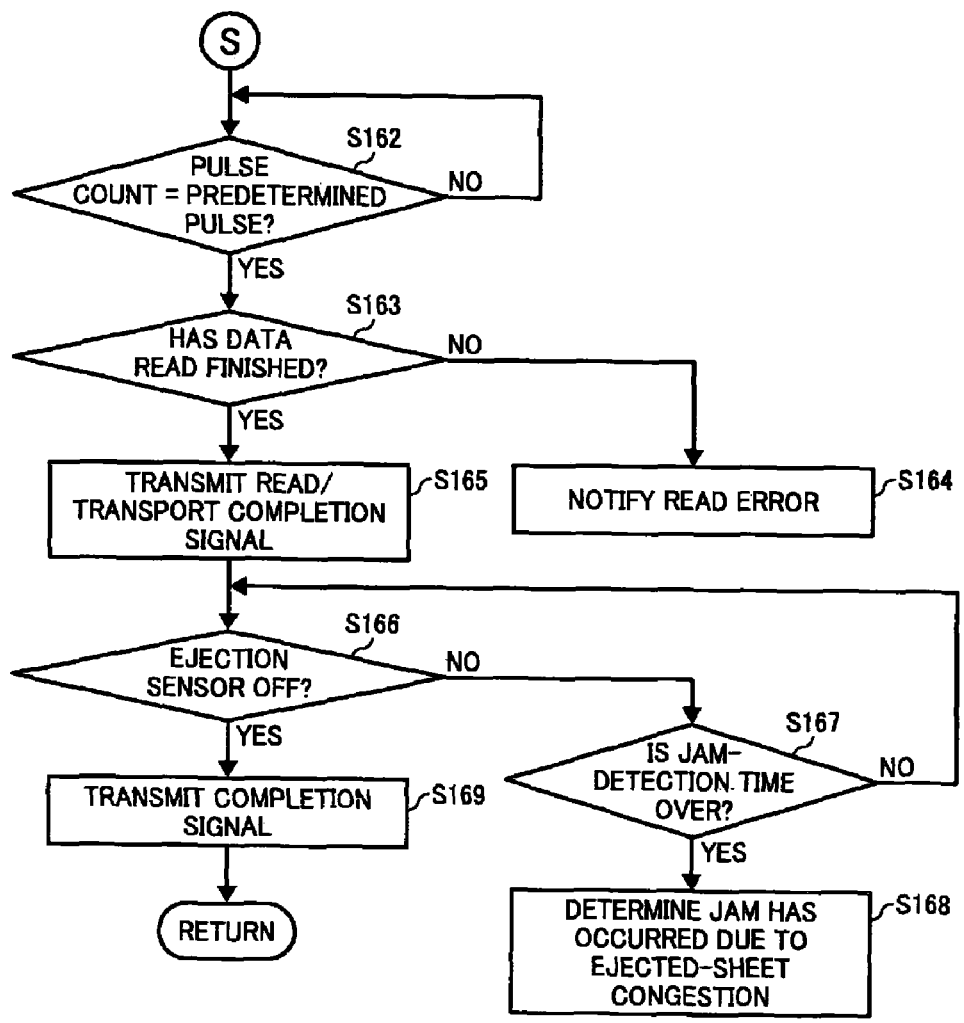

FIGS. 25 and 26 are flowcharts of transport-control process performed after reading starts. In the process in one-sided mode explained below, one or both of a paper medium and e-paper (corresponding to consolidation) can be read and transported.

As shown in FIG. 25, the controller 100 determines whether a sheet is e-paper (step S151). When the sheet is not e-paper, but is a paper medium (No at step S151), the controller 100 sets the speed of the read motor 103 based on the read magnification as previously described in the first embodiment (corresponding to the process from steps S36 to S57 in FIGS. 12 and 13). Upon receipt of the read-start signal from the main-body controller 111, the controller 100 performs the reading operation.

On the other hand, when determining that the sheet is e-paper at step S151, the controller 100 sets the speed of the read motor 103 based on the required communication time for the communication reader 81" (step S152). Upon receipt of the read-start signal from the main-body controller 111, the controller 100 rotates the read motor 103 to drive the read-start roller pair 37 and the read-end roller pair 40 at a transport speed corresponding to the required communication time (step S153). The controller 100 calculates the required communication time based on the volume of the e-paper detected at step S8 in FIG. 20.

The controller 100 transmits the signal indicating start of read and transport of the e-paper to the main-body controller 111 (step S154). The communication reader 81" transmits a signal requesting the full-page electronic data to the e-paper. In response to the signal, the e-paper transmits the full-page electronic data to the communication reader 81" in batch. The communication reader 81" then compares the volume information (obtained by the controller 100 from the detector 802' at step S8 in FIG. 20) transmitted beforehand from the controller 100 with the volume of the electronic data transmitted from the e-paper. When the volume indicated by the volume information matches the volume of the electronic data, the communication reader 81" transmits a signal indicating read completion of the full-page electronic data of the e-paper to the controller 100.

Alternatively, the communication reader 81" can transmit the volume information of the electronic data of the e-paper to the controller 100. In this case, the controller 100 compares the volume information with the volume information of the electronic data, and determines read completion.

The controller 100 determines whether the leading edge of the sheet has been detected by the ejection sensor 50, i.e., the ejection sensor 50 is ON (step S155). When the leading edge of the sheet has not been detected by the ejection sensor 50 (NO at step S155), the controller 100 determines whether the jam-detection time is over (step S156). When the jam-detection time is over (YES at step S156), the controller 100 determines that a jam has occurred before the position of the ejection sensor 50, and displays jam notification on the display unit 48 (step S157).

On the other hand, when determining that the ejection sensor 50 is ON at step S155, the controller 100 determines whether the read-end sensor 47 is OFF (step S158). When the read-end sensor 47 is not OFF (NO at step S158), the controller 100 determines whether the jam-detection time is over (step S159). When the jam-detection time is over (YES at step S159), the controller 100 determines that it is due to a registration-congestion jam, and displays jam notification on the display unit 48 (step S160).

When the read-end sensor 47 is OFF (YES at step S158), the controller 100 starts the trailing-edge count for counting the pulse of the read motor 103 (step S161).

Then, as shown in FIG. 26, the controller 100 determines whether the pulse count of the read motor 103 has reached the predetermined pulse (step S162). When the pulse count has reached the predetermined pulse (YES at step S162), the controller 100 determines whether the communication reader 81" has finished data read (step S163). Specifically, the communication reader 81" transmits a signal indicating read completion of the full-page electronic data of the e-paper to the controller 100. When the communication reader 81" has not finished data read at step S163, the controller determines that it is due to a read error, and displays error notification on the display unit 48 (step S164).

On the other hand, when determining that the communication reader 81" has finished data read at step S163, the controller 100 transmits a signal indicating completion of read and transport of the e-paper to the main-body controller 111 (step S165). The controller 100 determines whether the ejection sensor 50 is OFF (step S166). When the ejection sensor 50 is not OFF (No at step S166), the controller 100 determines whether the jam-detection time is over (step S167).

When the jam-detection time is over (YES at step S167), the controller 100 determines that it is due to a jam caused by ejected-sheet congestion, and displays jam notification on the display unit 48 (step S168). When the ejection sensor 50 is OFF (YES at step S166), the controller 100 transmits a signal indicating that sheet-ejection is complete to the main-body controller 111 (step S169), and the process ends.

In the second embodiment, read completion is checked when the pulse count has reached the predetermined pulse, after the read-end sensor 47 is turned off. However, read completion can be checked when the ejection sensor 50 is turned off.

As described above, according to the second embodiment, the communication reader 81" is arranged near the transport path between the read-end sensor 47 and the ejection roller 42 downstream of the read position 80 of the optical reader 81' in the transport direction, to read the e-paper on the ejection tray 43 side.

With this configuration, the read-start position of the communication reader 81" and the read position 80 of the optical reader 81' are away from each other, and the read-start position is on the ejection tray side. In the read operation by the communication reader 81", the influence of the transport skew is small as compared to the optical read. Therefore, for example, the conventional transport control of the ADF 230 can be performed for the paper medium, and the butting operation for correcting the skew and the registration suspension on the upstream side of the read position 80 are not performed for the e-paper, so that the e-paper can be carried at a higher speed than the speed at the time of read, to the read-start position of the communication reader 81" on the downstream side of the read position 80. Further, the electronic data of the e-paper carried at high speed can be reliably read collectively, for example, near the ejection roller 42, while reducing the influence on the transport of the next sheet. Further, maintenance of the communication reader 81" can be performed at the time of maintenance of the ADF 230.

The process from step S149 to step S151 and onward can be performed without transmitting the registration-suspension signal (step S150). With this, the transfer speed can be further improved.

The butting operation and the registration suspension can be performed based on a coefficient of friction of the ADF 230 relative to various rollers, which is different according to the type of e-paper. With this, appropriate transfer control can be performed according to the specification of e-paper, whereby the e-paper can be read reliably.

The medium type and the volume of the electronic data are detected by the detector 802' arranged near the access roller 31 in the state with the sheet being substantially stopped, and the electronic data of the e-paper is read by the communication reader 81" arranged on the ejection tray 43 side. Therefore, different transport control is selected based on the discrimination of the medium type, and, for example, the processing time for calculating the required communication time required for setting the transport speed can be ensured. Besides, because the detector 802' has both the medium type detection function and the function for detecting the volume of the e-paper, the second embodiment is excellent in space saving, reduction of the number of parts, and efficient maintenance, as compared with a configuration in which the both functions are separately provided. Accordingly, it is useful for improving the reliability of the copier 21 as the reading device.

In the second embodiment, the communication reader 81" is located near the ejection roller 42 or the ejection sensor 50. However, in addition thereto, another communication reader can be provided near the exposure glass 22a (e.g., below a sheet-scale), and the read by communication can be performed at two positions. The other communication reader is for reading the e-paper placed on the exposure glass 22a. In addition, the communication reader 81" can be provided near the table 24.

In the second embodiment, e-paper is read while being carried between the read-end sensor 47 and the ejection sensor 50 or the ejection roller 42. However, the same effect can be obtained by reading e-paper while transport of the e-paper is being suspended. For example, transport of the ejected sheet is suspended in a state with the e-paper being sandwiched between two rollers of the ejection roller 42, and after the e-paper is read, transport of the ejected sheet can be restarted. In this case, the transport of the e-paper can be promptly ejected onto the ejection tray 43 after the read.

Even if e-paper using the polymer film substrate having excellent flexibility is widely used, combined use with a paper medium is assumed as a conference material. Therefore, it is desired to load a paper medium and e-paper together on the ADF 230 to read both of them, and store the data as electronic data, or transmit the data to another image processor. When the conventional technology is used, complicated operation is required, for example, a paper medium and e-paper are manually differentiated, and the paper medium is mounted on the table of a reading device- and read, while the e-paper is read by being connected to a personal computer via the USB, and the electronic data are re-edited. On the other hand, according to the embodiments explained above, the communication reader 81", the volume detector 801, and the medium type detector 802 (or the detector 802') are provided in the copier 21 as an existing reading device (or image forming apparatus). The medium type is discriminated at the time of carrying one or both paper medium and e-paper to control the transport speed, and the full-page electronic data of the e-paper is read collectively. Thus, both the paper medium and e-paper can be read, and the read operation of the e-paper can be simplified, which reduces the processing time.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A reading device comprising:
   a transporting unit that transports, as an original, any one of electronic paper and a paper medium or both to a read position, the electronic paper including an electronic-data storage unit that stores therein electronic data and a first communication unit that communicates with an external device;
   a determining unit that includes a second communication unit to transmit a predetermined signal to the original, and determines whether the original is the electronic paper or the paper medium based on a response to the predetermined signal;
   a transport control unit that controls transport by the transporting unit based on a determination by the determining unit;
   a first reading unit that includes a third communication unit to communicate with the first communication unit at the read position, and reads the electronic data stored in the electronic-data storage unit;
   a second reading unit that optically reads an image on the paper medium at the read position to obtain electronic data of the image; and
   a read control unit that controls reading operation by the first reading unit and the second reading unit,
   wherein when the original includes both the electronic paper and the paper medium, the read control unit controls the first reading unit and the second reading unit to read the original regardless of the determination by the determining unit, and, when reading operation by both the first reading unit and the second reading unit is successful, discards an image read by the second reading unit.

2. The reading device according to claim 1, wherein the read control unit controls the reading operation based on the determination by the determining unit.

3. The reading device according to claim 1, wherein the determining unit is located near a transport path on an upstream side of the read position in a transport direction.

4. The reading device according to claim 1, wherein
   the first reading unit is located near a transport path on a downstream side of the read position in a transport direction,
   the transport control unit controls the transporting unit to carry the electronic paper to the downstream side of the read position in the transport direction based on the determination by the determining unit, and the read control unit controls the first reading unit to read the electronic paper on the downstream side of the read position in the transport direction.

5. The reading device according to claim 1, further comprising a shifting unit that shifts the first reading unit from the read position to near an exposure glass on which the original is placed, wherein the first reading unit reads the electronic data of the electronic paper on the exposure glass near the exposure glass.

6. An image forming apparatus comprising:

the reading device according to claim 1; and an image forming unit that forms an image on a recording medium based on electronic data obtained by the first reading unit and the second reading unit.

7. A reading device comprising:

a transporting unit that transports, as an original, any one of electronic paper and a paper medium or both to a read position, the electronic paper including an electronic-data storage unit that stores therein electronic data and a first communication unit that communicates with an external device;

a determining unit that includes a second communication unit to transmit a predetermined signal to the original, and determines whether the original is the electronic paper or the paper medium based on a response to the predetermined signal;

a transport control unit that controls transport by the transporting unit based on a determination by the determining unit;

a first reading unit that includes a third communication unit to communicate with the first communication unit at the read position, and reads the electronic data stored in the electronic-data storage unit;

a second reading unit that optically reads an image on the paper medium at the read position to obtain electronic data of the image;

a read control unit that controls reading operation by the first reading unit and the second reading unit;

a detecting unit that includes a fourth communication unit to communicate with the first communication unit, and detects a volume of the electronic data stored in the electronic-data storage unit; and a calculating unit that calculates communication time that the first reading unit requires to read the electronic data based on the volume of the electronic data, wherein the transport control unit controls transport of the electronic paper by the transporting unit based on the communication time.

8. A reading device comprising:

a transporting unit that transports, as an original, any one of electronic paper and a paper medium or both to a read position, the electronic paper including an electronic-data storage unit that stores therein electronic data and a first communication unit that communicates with an external device;

a determining unit that includes a second communication unit to transmit a predetermined signal to the original, and determines whether the original is the electronic paper or the paper medium based on a response to the predetermined signal;

a transport control unit that controls transport by the transporting unit based on a determination by the determining unit;

a first reading unit that includes a third communication unit to communicate with the first communication unit at the read position, and reads the electronic data stored in the electronic-data storage unit;

a second reading unit that optically reads an image on the paper medium at the read position to obtain electronic data of the image;

a read control unit that controls reading operation by the first reading unit and the second reading unit;

a detecting unit that includes a fourth communication unit to communicate with the first communication unit, and detects a volume of the electronic data stored in the electronic-data storage unit; and a calculating unit that calculates communication time that the first reading unit requires to read the electronic data based on the volume of the electronic data, wherein the transport control unit controls transport of the electronic paper by the transporting unit based on the communication time, wherein the transport control unit sets transport speed of the electronic paper by the transporting unit during the reading operation based on the communication time.

9. A reading device comprising:

a transporting unit that transports, as an original, any one of electronic paper and a paper medium or both to a read position, the electronic paper including an electronic-data storage unit that stores therein electronic data and a first communication unit that communicates with an external device;

a determining unit that includes a second communication unit to transmit a predetermined signal to the original, and determines whether the original is the electronic paper or the paper medium based on a response to the predetermined signal;

a transport control unit that controls transport by the transporting unit based on a determination by the determining unit;

a first reading unit that includes a third communication unit to communicate with the first communication unit at the read position, and reads the electronic data stored in the electronic-data storage unit;

a second reading unit that optically reads an image on the paper medium at the read position to obtain electronic data of the image;

a read control unit that controls reading operation by the first reading unit and the second reading unit;

a detecting unit that includes a fourth communication unit to communicate with the first communication unit, and detects a volume of the electronic data stored in the electronic-data storage unit; and a calculating unit that calculates communication time that the first reading unit requires to read the electronic data based on the volume of the electronic data, wherein the transport control unit controls transport of the electronic paper by the transporting unit based on the communication time, wherein the transport control unit suspends transport of the electronic paper at the read position based on the communication time, and, after the first reading unit reads all the electronic data, resumes the transport of the electronic paper.

10. A reading device comprising:

a transporting unit that transports, as an original, any one of electronic paper and a paper medium or both to a read position, the electronic paper including an electronic-data storage unit that stores therein electronic data and a first communication unit that communicates with an external device;

a determining unit that includes a second communication unit to transmit a predetermined signal to the original, and determines whether the original is the electronic paper or the paper medium based on a response to the predetermined signal;

a transport control unit that controls transport by the transporting unit based on a determination by the determining unit;

a first reading unit that includes a third communication unit to communicate with the first communication unit at the read position, and reads the electronic data stored in the electronic-data storage unit;

a second reading unit that optically reads an image on the paper medium at the read position to obtain electronic data of the image;

a read control unit that controls reading operation by the first reading unit and the second reading unit;

a detecting unit that includes a fourth communication unit to communicate with the first communication unit, and detects a volume of the electronic data stored in the electronic-data storage unit; and a calculating unit that calculates communication time that the first reading unit requires to read the electronic data based on the volume of the electronic data, wherein the transport control unit controls transport of the electronic paper by the transporting unit based on the communication time, wherein the detecting unit is located near a transport path on an upstream side of the read position in a transport direction.

11. A non-transitory computer-readable medium having computer readable program codes embodied in the medium that, when executed, causes a computer to execute:

transmitting a predetermined signal to an original;

determining whether the original is electronic paper or a paper medium based on a response to the predetermined signal;

controlling transport of the original to a read position based on a determination result obtained at the determining;

controlling reading operation to read electronic data of electronic paper or optically read an image on a paper medium at the read position based on a determination result obtained at the determining;

detecting a volume of the electronic data of the electronic paper;

calculating communication time required to read the electronic data based on the volume of the electronic data; and controlling transport speed of the electronic paper based on the communication time.

* * * * *